(12) United States Patent
Sundararajan et al.

(10) Patent No.: US 10,749,713 B2
(45) Date of Patent: Aug. 18, 2020

(54) RESOURCE PATTERN FOR UPLINK TRANSMISSIONS

(71) Applicant: QUALCOMM Incorporated, San Diego, CA (US)

(72) Inventors: Jay Kumar Sundararajan, San Diego, CA (US); Satashu Goel, San Diego, CA (US); Jing Jiang, San Diego, CA (US); Naga Bhushan, San Diego, CA (US); Yeliz Tokgoz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 16/115,202

(22) Filed: Aug. 28, 2018

(65) Prior Publication Data

US 2019/0149364 A1    May 16, 2019

Related U.S. Application Data

(60) Provisional application No. 62/585,464, filed on Nov. 13, 2017.

(51) Int. Cl.
*H04L 25/02* (2006.01)
*H04W 72/12* (2009.01)
(Continued)

(52) U.S. Cl.
CPC ....... *H04L 25/0226* (2013.01); *H04B 7/0617* (2013.01); *H04L 5/005* (2013.01);
(Continued)

(58) Field of Classification Search
CPC ............ H04L 25/0226; H04L 27/2613; H04L 27/2607; H04L 5/0091; H04L 5/005; H04W 72/1289; H04W 72/0446; H04W 72/0413; H04W 72/1268; H04W 74/04; H04W 74/002; H04B 7/0617
See application file for complete search history.

(56) References Cited

U.S. PATENT DOCUMENTS 10,356,754 B2 *   7/2019   Lee .................... H04W 56/001
2016/0044668 A1 * 2/2016   Yoon .................. H04W 76/14
                                                       370/280

(Continued)

OTHER PUBLICATIONS

International Search Report and Written Opinion—PCT/US2018/048506—ISA/EPO—dated Feb. 1, 2019.
(Continued)

*Primary Examiner* — Afshawn M Towfighi
(74) *Attorney, Agent, or Firm* — Holland & Hart LLP

(57) ABSTRACT

Some wireless communication systems may attempt to balance frequent transmission opportunities (e.g., where the frequency of the opportunities may refer to gaps in the time domain, frequency domain, etc.) with a desire for communication reliability and/or interference diversity. In accordance with the described techniques, some such systems may apportion communicating devices into groups, where resources are strategically assigned to each group so as to reduce latency without significantly compromising communication reliability or interference diversity (e.g., by allowing a membership of the groups to cycle through all possible combinations before repeating). Such techniques may support delay-sensitive communications, channel sounding procedures, or other similar types of transmissions. Resources may be allocated based on a scheduling parameter transmitted to a user equipment (UE), which may implicitly or explicitly indicate a plurality of resource offsets to the UE.

30 Claims, 24 Drawing Sheets

(51) Int. Cl.
  *H04B 7/06*    (2006.01)
  *H04L 5/00*    (2006.01)
  *H04L 27/26*   (2006.01)
  *H04W 72/04*   (2009.01)
  *H04W 74/04*   (2009.01)

(52) U.S. Cl.
  CPC ........ *H04L 5/0091* (2013.01); *H04L 27/2607* (2013.01); *H04L 27/2613* (2013.01); *H04W 72/0413* (2013.01); *H04W 72/0446* (2013.01); *H04W 72/1289* (2013.01); *H04W 72/1268* (2013.01); *H04W 74/04* (2013.01)

(56) References Cited

U.S. PATENT DOCUMENTS

2017/0104568 A1* 4/2017 Nasiri Khormuji . H04B 7/0413
2018/0295608 A1* 10/2018 Nguyen ................. H04L 5/001
2018/0310257 A1* 10/2018 Papasakellariou .... H04W 52/30
2019/0342061 A1* 11/2019 Kim .................. H04W 72/0473

OTHER PUBLICATIONS

Choi S., et al.,(Philips): "Contention-Free Scheduling of HiperLAN/2 Frames Without QoS Limitations; 11-01-0013-00-000w-contention-free-scheduling-of-hiperlan-2-frames-without -qos-limitations", IEEE Draft; 11-01-0013-00-000W-Contention-Free-Scheduling-of-Hiperlan-2-Frames-Without-QOS-Limitations, IEEE-SA Mentor, Piscataway, NJ USA, vol. 802.11w, Jan. 18, 2001, XP017693434, pp. 1-7, [retrieved on Jan. 18, 2001].
Orfanos G., et al., "A Centralized MAC Protocol with QoS Support for Wireless LANs", IEEE International Symposium on Personal, Indoor and Mobile Radio Communications, PIMRC, IEEE; PI, XX, Sep. 1, 2007, pp. 1-5, XP031168598, ISBN: 978-1-4244-1143-6.
Partial International Search Report—PCT/US2018/048506—ISA/EPO—dated Dec. 4, 2018.

* cited by examiner

Group 1

Group 2

Group 3

Group 4

RESOURCE PATTERN FOR UPLINK TRANSMISSIONS

CROSS REFERENCES

The present Application for Patent claims the benefit of U.S. Provisional Patent Application No. 62/585,464 by SUNDARARAJAN, et al., entitled "RESOURCE PATTERN FOR UPLINK TRANSMISSIONS," filed Nov. 13, 2017, assigned to the assignee hereof, and expressly incorporated herein.

BACKGROUND

The following relates generally to wireless communication, and more specifically to resource patterns for uplink transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications may experience a trade-off between access latency and reliability. To provide a wireless device with low access latency, a wireless network may attempt to minimize the gap between successive transmission opportunities for the wireless device. In some cases, the wireless network may reduce access latency by assigning the same resources to more than one UE (i.e., which may be referred to as overlapping allocation). However, if multiple UEs attempt to access the overlapping resources their transmissions may collide, decreasing reliability for the communications. Such collisions may prove especially problematic in cases in which the same resources are repeatedly assigned to the same set of UEs because persistent collisions may occur when these UEs try to access the overlapping resources. Thus, techniques that reduce access latency may in some cases be associated with an offsetting reduction in reliability that obviates the benefits of the latency reduction. Additionally or alternatively, some wireless communications may suffer decreased performance because the transmissions are not evenly spread out in frequency.

SUMMARY

The described techniques relate to improved methods, systems, devices, or apparatuses that support resource patterns for uplink transmissions. Generally, the described techniques provide for apportioning a set of user equipment (UEs) into groups, such that each group is associated with a given resource pattern. Each UE may be assigned to multiple groups within a given repetition of the resource pattern, as described further below. In accordance with aspects of the present disclosure, the allocation of the UEs into the various groups may be performed so as to reduce the time delay or frequency gap between successive transmission opportunities for any given UE. The allocation of the UEs into the various groups may additionally or alternatively decrease transmission interference between any two UEs (e.g., by ensuring that the two UEs do not always attempt to access the same transmission resources). Though aspects of the following are described in the context of allocating resources in the time domain (e.g., which may impact communication latency), the described techniques may additionally apply to the allocation of resources in the frequency domain (or other domains). For example, the same scheduling strategy that may be used in the time domain to provide frequent transmission opportunities with interference diversity and sparse resource overlap may be applied in the frequency domain to produce a transmission that is approximately evenly spread out in frequency (e.g., which may improve the accuracy of channel estimation based at least in part on interpolation of channel sounding reference signals or provide other such benefits).

A method of wireless communication is described. The method may include receiving, from a base station, a scheduling parameter associated with a transmission opportunity period; determining, based at least in part on the scheduling parameter, a plurality of resource offsets for the UE, where each resource offset of the plurality of resource offsets includes a timing offset; and performing an uplink transmission using a set of transmission resources associated with the plurality resource of offsets.

An apparatus for wireless communication is described. The apparatus may include means for receiving, from a base station, a scheduling parameter associated with a transmission opportunity period; means for determining, based at least in part on the scheduling parameter, a plurality of resource offsets for the UE, where each resource offset of the plurality of resource offsets includes a timing offset; and means for performing an uplink transmission using a set of transmission resources associated with the plurality of resource offsets.

Another apparatus for wireless communication is described. The apparatus may include a processor, memory in electronic communication with the processor, and instructions stored in the memory. The instructions may be operable to cause the processor to receive, from a base station, a scheduling parameter associated with a transmission opportunity period; determine, based at least in part on the scheduling parameter, a plurality of resource offsets for the UE, where each resource offset of the plurality of resource offsets includes a timing offset; and perform an uplink transmission using a set of transmission resources associated with the plurality of resource offsets.

A non-transitory computer-readable medium for wireless communication is described. The non-transitory computer-readable medium may include instructions operable to cause a processor to receive, from a base station, a scheduling parameter associated with a transmission opportunity period; determine, based at least in part on the scheduling parameter, a plurality of resource offsets for the UE, where each resource offset of the plurality of resource offsets includes a timing offset; and perform an uplink transmission using a set of transmission resources associated with the plurality of resource offsets.

Some examples of the method, apparatus, and non-transitory computer-readable medium described above may further include processes, features, means, or instructions for determining a periodicity of the transmission opportunity period based at least in part on the scheduling parameter. Some examples of the method, apparatus, and non-transitory computer-readable medium described above may further include processes, features, means, or instructions for determining the set of transmission resources based at least in part on the periodicity of the transmission opportunity period and the plurality of resource offsets for the UE with respect to the transmission opportunity period.

Some examples of the method, apparatus, and non-transitory computer-readable medium described above may further include processes, features, means, or instructions for determining a cyclic shift offset associated with a UE; determining a number of UEs associated with the transmission opportunity period based at least in part on the scheduling parameter. In some examples of the method, apparatus, and non-transitory computer-readable medium described above, determining the plurality of resource offsets for the UE may be based at least in part on the number of UEs associated with the transmission opportunity period and the determined cyclic shift offset.

Some examples of the method, apparatus, and non-transitory computer-readable medium described above may further include processes, features, means, or instructions for determining a base sequence and a cyclic shift offset associated with the UE. In some examples of the method, apparatus, and non-transitory computer-readable medium described above, determining the plurality of resource offsets for the UE may be based at least in part on the base sequence and the determined cyclic shift offset.

In some examples of the method, apparatus, and non-transitory computer-readable medium described above, the scheduling parameter includes an explicit indication of the plurality of resource offsets for the UE.

Some examples of the method, apparatus, and non-transitory computer-readable medium described above may further include processes, features, means, or instructions for identifying an interference metric for at least one other UE associated with the transmission opportunity period, where the plurality of resource offsets may be determined based at least in part on the interference metric.

In some examples of the method, apparatus, and non-transitory computer-readable medium described above, the scheduling parameter includes a first explicit indication of a number of UEs associated with the transmission opportunity period, a number of cyclic shifts, a periodicity of the transmission opportunity period, or a combination thereof, a second explicit indication of a number of the plurality of resource offsets, or both.

In some examples of the method, apparatus, and non-transitory computer-readable medium described above, the scheduling parameter includes an index of a look-up table, the index indicating a number of UEs associated with the transmission opportunity period, a number of the plurality of resource offsets, or both.

In some examples of the method, apparatus, and non-transitory computer-readable medium described above, the scheduling parameter includes a first explicit indication of a periodicity of the transmission opportunity period, a second explicit indication of the plurality of resource offsets, or both.

In some examples of the method, apparatus, and non-transitory computer-readable medium described above, the uplink transmission includes a sounding reference signal (SRS) transmission, a scheduling request transmission, or a data transmission.

In some examples of the method, apparatus, and non-transitory computer-readable medium described above, the data transmission includes a grant-free uplink transmission.

In some examples of the method, apparatus, and non-transitory computer-readable medium described above, determining the plurality of resource offsets for the UE includes: determining a plurality of resource block indices of the transmission opportunity period.

In some examples of the method, apparatus, and non-transitory computer-readable medium described above, each resource offset of the plurality of resource offsets further includes a frequency offset.

A method of wireless communication is described. The method may include identifying a plurality of UEs associated with a transmission opportunity period; apportioning the set of UEs into a set of groups, each group associated with a respective resource offset, where each respective resource offset comprises a timing offset; determining a scheduling parameter for each UE of the set of UEs based at least in part on a number of UEs in the set of UEs; and transmitting the scheduling parameter to each UE of the set of UEs.

An apparatus for wireless communication is described. The apparatus may include means for identifying a plurality of UEs associated with a transmission opportunity period; means for apportioning the set of UEs into a set of groups, each group associated with a respective resource offset, where each respective resource offset comprises a timing offset; means for determining a scheduling parameter for each UE of the set of UEs based at least in part on a number of UEs in the set of UEs; and means for transmitting the scheduling parameter to each UE of the set of UEs.

Another apparatus for wireless communication is described. The apparatus may include a processor, memory in electronic communication with the processor, and instructions stored in the memory. The instructions may be operable to cause the processor to identify a plurality of UEs associated with a transmission opportunity period; apportion the set of UEs into a set of groups, each group associated with a respective resource offset, where each respective resource offset comprises a timing offset; determine a scheduling parameter for each UE of the set of UEs based at least in part on a number of UEs in the set of UEs; and transmit the scheduling parameter to each UE of the set of UEs.

A non-transitory computer-readable medium for wireless communication is described. The non-transitory computer-readable medium may include instructions operable to cause a processor to identify a plurality of UEs associated with a transmission opportunity period; apportion the set of UEs into a set of groups, each group associated with a respective resource offset, where each respective resource offset comprises a timing offset; determine a scheduling parameter for each UE of the set of UEs based at least in part on a number of UEs in the set of UEs; and transmit the scheduling parameter to each UE of the set of UEs.

Some examples of the method, apparatus, and non-transitory computer-readable medium described above may further include processes, features, means, or instructions for determining a periodicity of the transmission opportunity period based at least in part on the number of UEs in the set of UEs.

Some examples of the method, apparatus, and non-transitory computer-readable medium described above may further include processes, features, means, or instructions for determining the resource offset for each group based at least in part on the number of UEs in the set of UEs. Some examples of the method, apparatus, and non-transitory computer-readable medium described above may further include processes, features, means, or instructions for identifying a set of transmission resources for each group based at least in part on the periodicity of the transmission opportunity period and the resource offset for the group. Some examples of the method, apparatus, and non-transitory computer-readable medium described above may further include processes, features, means, or instructions for receiving an uplink transmission over at least one set of transmission resources.

In some examples of the method, apparatus, and non-transitory computer-readable medium described above, the uplink transmission includes a SRS transmission, a SR transmission, or a data transmission.

In some examples of the method, apparatus, and non-transitory computer-readable medium described above, the data transmission includes a grant-free uplink transmission.

Some examples of the method, apparatus, and non-transitory computer-readable medium described above may further include processes, features, means, or instructions for determining a base sequence of resource offsets and determining a cyclic shift offset for each UE of the set of UEs, where the scheduling parameter may be based at least in part on the determined base sequence of resource offsets and the determined cyclic shift offset.

Some examples of the method, apparatus, and non-transitory computer-readable medium described above may further include processes, features, means, or instructions for determining a latency metric for the transmission opportunity period, where the set of UEs may be apportioned into the set of groups based at least in part on the latency metric.

Some examples of the method, apparatus, and non-transitory computer-readable medium described above may further include processes, features, means, or instructions for determining a number of UEs in each group of the set of groups, where the scheduling parameter may be based at least in part on the number of UEs in the set of UEs and the number of UEs in each group.

In some examples of the method, apparatus, and non-transitory computer-readable medium described above, the scheduling parameter for each UE includes an explicit indication of a plurality of resource offsets for the UE.

Some examples of the method, apparatus, and non-transitory computer-readable medium described above may further include processes, features, means, or instructions for determining an interference metric between two UEs of the set of UEs, where the set of UEs may be apportioned into the set of groups based at least in part on the interference metric.

In some examples of the method, apparatus, and non-transitory computer-readable medium described above, a scheduling parameter for a UE of the set of UEs includes a first explicit indication of the number of UEs associated with the transmission opportunity period, a number of cyclic shifts, a periodicity of the transmission opportunity period, or a combination thereof; a second explicit indication of a number of resource offsets for the UE; or both.

In some examples of the method, apparatus, and non-transitory computer-readable medium described above, a scheduling parameter for a UE of the set of UEs includes an index of a look-up table, the index indicating the number of UEs associated with the transmission opportunity period, a number of resource offsets for the UE, or both.

In some examples of the method, apparatus, and non-transitory computer-readable medium described above, a scheduling parameter for a UE of the set of UEs includes a first explicit indication of a periodicity of the transmission opportunity period, a second explicit indication of a plurality of resource offsets for the UE, or both.

In some examples of the method, apparatus, and non-transitory computer-readable medium described above, each resource offset includes an index to a resource block of the transmission opportunity period.

In some examples of the method, apparatus, and non-transitory computer-readable medium described above, each group of the set of groups includes a unique set of UEs of the set of UEs.

In some examples of the method, apparatus, and non-transitory computer-readable medium described above, each group of the set of groups includes a respective pair of UEs of the set of UEs.

In some examples of the method, apparatus, and non-transitory computer-readable medium described above, the set of groups includes each possible pair of UEs of the set of UEs.

In some examples of the method, apparatus, and non-transitory computer-readable medium described above, each respective resource offset further comprises a frequency offset.

DETAILED DESCRIPTION

In order to provide a wireless device with reduced gaps between transmission opportunities (e.g., in time, frequency, etc.), a wireless system may employ an overlapping allocation scheme whereby the same set of resources are available for access by multiple wireless devices. These techniques may decrease the gap (e.g., in time or frequency) between successive transmission opportunities but may increase the probability of colliding transmissions (e.g., which may occur when multiple devices attempt to access the same wireless resources). Transmission collisions may decrease throughput or otherwise offset the benefits provided by the corresponding reduction in gaps between transmission opportunities. The described techniques provide for a resource allocation scheme that enables low latency transmissions with interference diversity and sparse resource overlap, transmissions that are relatively evenly spread out in frequency, etc. The resource allocation scheme may include apportioning a set of user equipment (UEs) into groups, where each group may be associated with a given resource offset. By selectively dividing the UEs into groups and assigning resources to each group, a wireless network may realize the interference diversity and sparse resource overlap without significantly compromising communication latency. For example, such a resource allocation scheme may apply to grant-free transmissions, scheduling request (SR) transmissions, sounding reference signals (SRSs), or other similar transmissions.

Aspects of the disclosure are initially described in the context of a wireless communications system. Aspects of the disclosure are then illustrated by and described with reference to resource allocation schemes and process flow diagrams. Aspects of the disclosure are further illustrated by and described with reference to apparatus diagrams, system diagrams, and flowcharts that relate to resource patterns for uplink transmissions.

Figure 1:
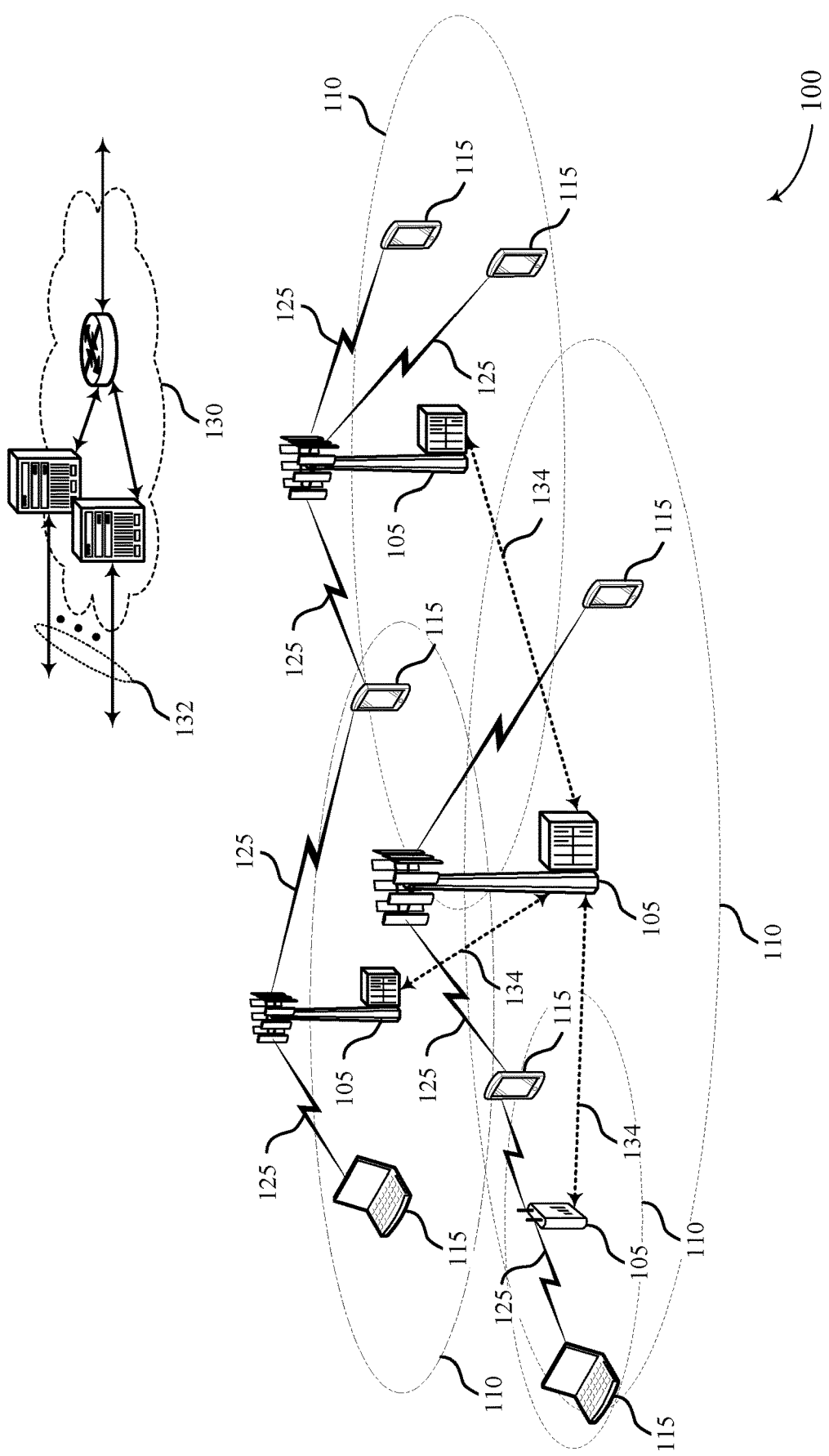
FIG. 1 illustrates an example of a wireless communications system that supports resource patterns for uplink transmissions in accordance with aspects of the present disclosure.

FIG. 1 illustrates an example of a wireless communications system 100 that supports resource patterns for uplink transmissions in accordance with various aspects of the present disclosure. The wireless communications system 100 includes base stations 105, UEs 115, and a core network 130. In some examples, the wireless communications system 100 may be an LTE network, an LTE-A network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at multiple antenna elements of an antenna array, or by processing received signals according to different receive beamforming weight sets applied to signals received at multiple antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may employ any of the various resource allocation schemes described herein. For example, a base station 105 may organize the UEs 115 in its respective geographic coverage area 110 into groups and allocate resources to each group (e.g., to provide for low latency transmissions with interference diversity and sparse resource overlap). The resource allocation may be in the time domain (e.g., the base station 105 may indicate a given duration of time for which UEs 115 in a given group may access the wireless resources) and/or the frequency domain (e.g., the base station 105 may indicate a set of resource blocks available for each group). The UEs 115 may use the allocated resources for uplink or sidelink transmissions (e.g., unscheduled transmissions or the like). In aspects of the present disclosure uplink and sidelink transmissions may be used interchangeably. That is, techniques that are described as supporting resource patterns for uplink transmissions may additionally support resource patterns for sidelink transmissions without deviating from the scope of the present disclosure.

In one example, a UE 115 may receive from a base station 105 a scheduling parameter associated with a transmission opportunity period. The UE 115 may determine, based at least in part on the scheduling parameter, a set of resource offsets for the UE 115, and perform an uplink transmission or sidelink transmission using a set of transmission resources associated with the set of offsets.

Figure 2:
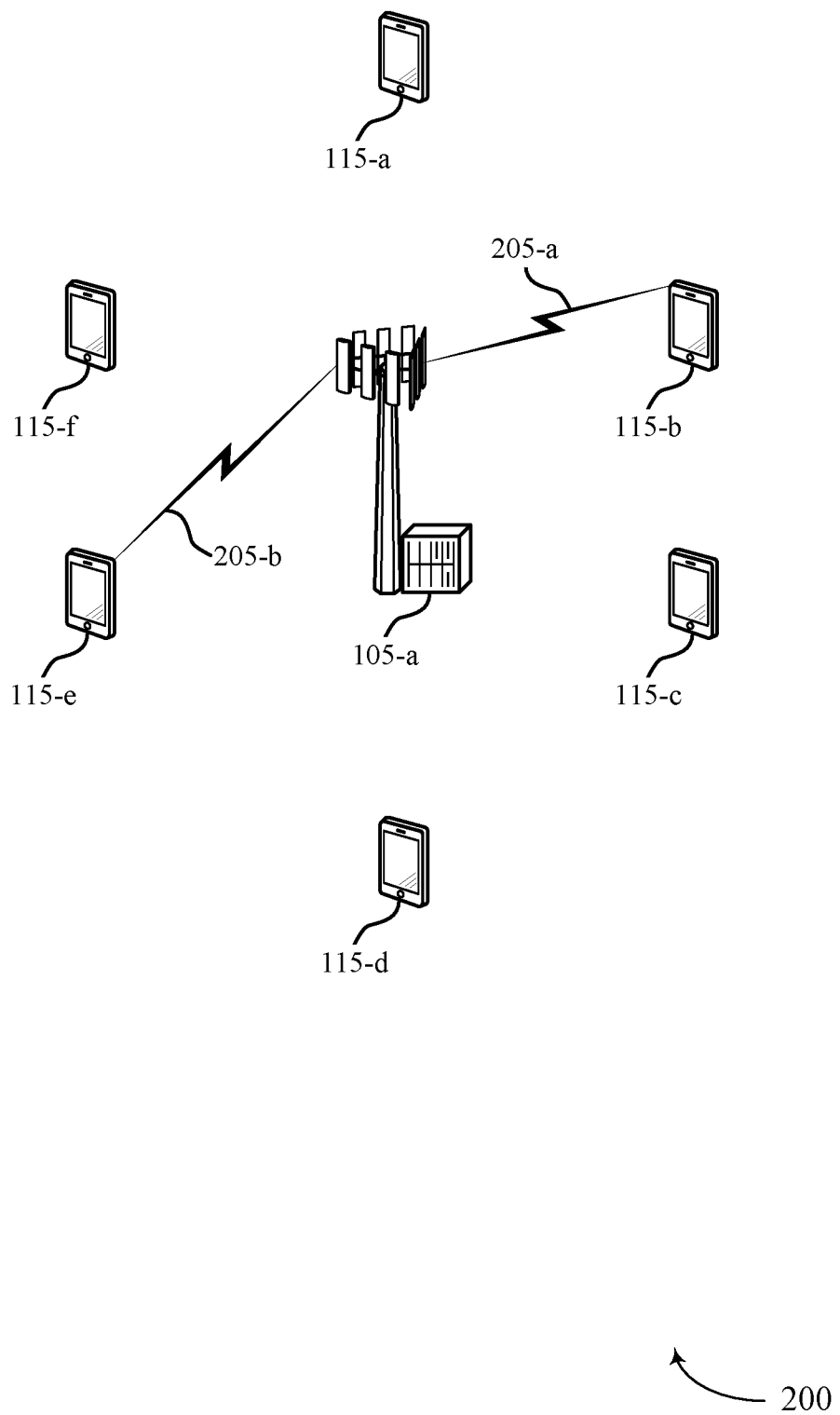
FIG. 2 illustrates an example of a wireless communications system that supports resource patterns for uplink transmissions in accordance with aspects of the present disclosure.

FIG. 2 illustrates an example of a wireless communications system 200 that supports resource patterns for uplink transmissions (e.g., data, control information, scheduling requests, etc.) in accordance with various aspects of the present disclosure. In some examples, wireless communications system 200 may implement aspects of wireless communications system 100. Wireless communications system 200 includes base station 105-a, UE 115-a, UE 115-b, UE 115-c, UE 115-d, UE 115-e, and UE 115-f, each of which may be an example of the corresponding device described with reference to wireless communications system 100.

Base station 105-a may attempt to allocate transmission resources among the six UEs 115 (e.g., so as to reduce communication latency and/or a jitter associated with a frequency profile of the communications). As an example of a simple solution, base station 105-a may simply cycle through the UEs 115. That is, base station 105-a may sequentially allocate resources to the UEs 115 such that no overlap occurs (i.e., such that no resource is allocated to more than one UE). While such an approach eliminates the potential for colliding transmissions, the resulting latency (e.g., or frequency spread) may be unacceptably high. Additionally or alternatively, such a resource allocation scheme may result in inefficient spectral use if not all of the UEs 115 are active. For example, if UE 115-a has a large communication load at any point in time while UE 115-b is inactive, the resources assigned for UE 115-b may go unused while UE 115-a gradually empties its transmit buffer.

In an extension of this solution, base station 105-a may employ a periodic allocation of resources with overlap. For example, base station 105-a may form three groups: one group consisting of UE 115-a and UE 115-d, a second group consisting of UE 115-b and UE 115-e, and a third group consisting of UE 115-c and UE 115-f Base station 105-a may cycle through the three pairs when allocating resources. While reducing the communication latency and/or frequency jitter compared to sequentially allocating resources for each UE 115, such an allocation scheme may suffer from persistent collisions. For example, if UE 115-b and UE 115-e are simultaneously active, their transmissions over respective links 205-a and 205-b may persistently collide. While it may be possible to distinguish the transmissions (e.g., based on reference signal parameters or other code-based orthogonality), the collisions could still degrade the quality of the transmissions.

A random allocation of UEs 115 to groups may help diversify the interference pattern (e.g., may ensure that transmissions of two UEs 115 do not persistently collide), but may not be able to provide sufficient latency or frequency jitter guarantees in all cases. That is, because of the random nature of the allocation scheme, a given UE 115 may in some cases endure long gaps between transmission opportunities. Additionally or alternatively, the random allocation may increase the complexity of the system by requiring base station 105-a to either blindly identify which UE 115 used each resource or to provide a mechanism to align the UE 115 and network in spite of the random choice of resources, which may increase overhead or otherwise negatively impact the system.

The described techniques provide for a deterministic solution that may provide a good trade-off between delay and interference diversity. In accordance with aspects of the present disclosure, base station 105-a may cycle through all possible pairs of UEs 115 when allocating resources (e.g., in order to improve the interference diversity). For example, if there are six UEs 115 and two are to be chosen as a pair, there may be fifteen possible pairs (e.g., based on a binomial coefficient, such as $(^6_2)$). While described in the context of pairings for the sake of simplicity, it is to be understood that the described techniques may be extended to cover cases in which the UEs 115 are divided into groups of any suitable size without deviating from the scope of the present disclosure. In some cases, the size of the groups may be determined based at least in part on a number of UEs 115 in the system, a tolerable latency threshold, a tolerable frequency jitter, etc. For example, larger groups may be used in cases in which reducing latency is more important than collision avoidance.

Figure 3:
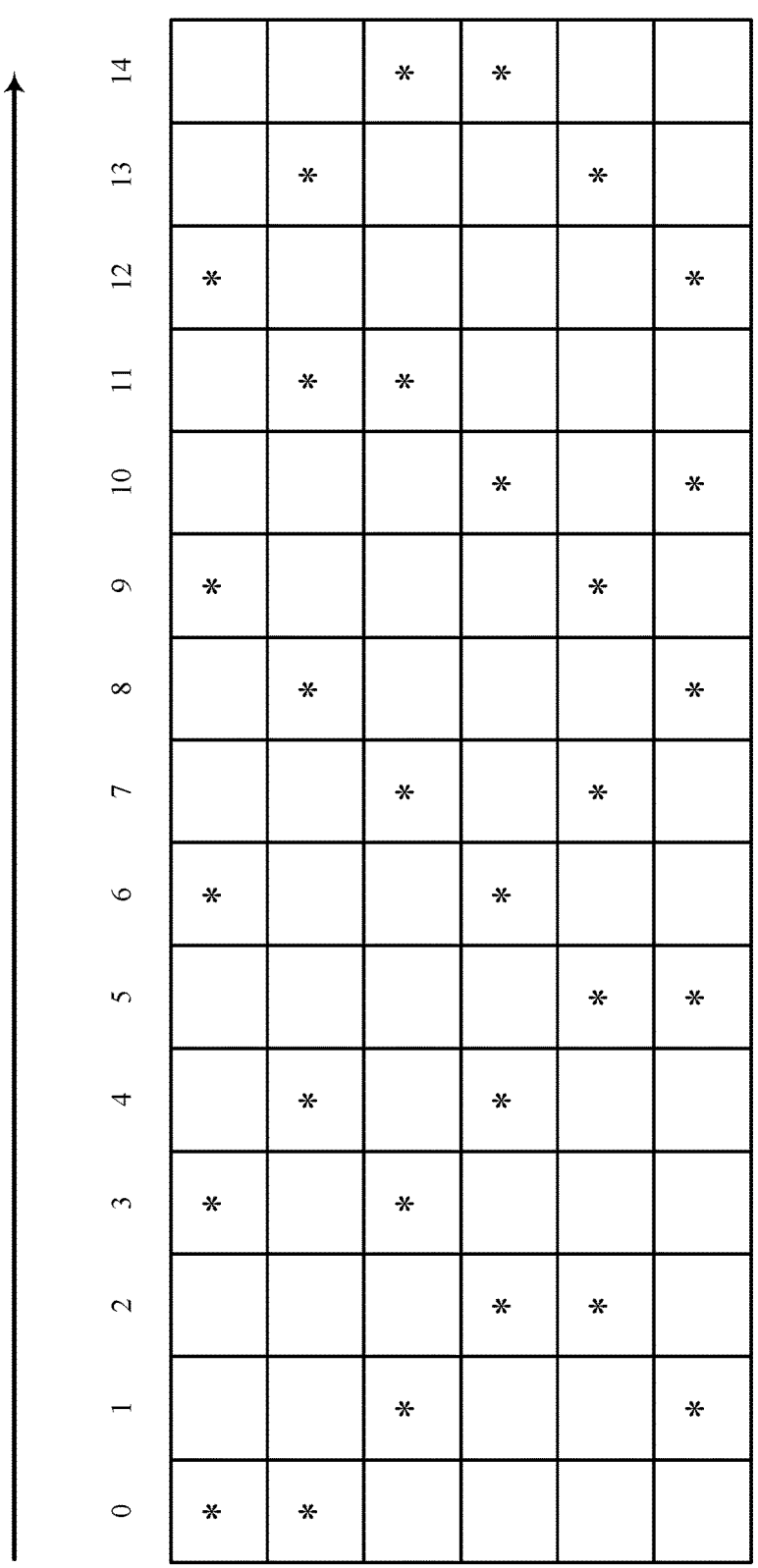
FIG. 3 illustrates an example of a resource allocation grid that supports resource patterns for uplink transmissions in accordance with aspects of the present disclosure.

By way of example, wireless communications system 200 includes fifteen possible pairs (as described above). Base station 105-a may identify the fifteen possible pairs and may arrange these pairs in a specific order, which may guarantee small gaps (or low latency) between successive scheduling opportunities for each individual UE 115. For example, resource allocation grid 300 described with reference to FIG. 3 illustrates a resource allocation pattern in which each UE 115 has a maximum delay of four slots between successive opportunities and every pair of UEs 115 is scheduled before the pattern repeats. Though described in the context of a time delay between successive opportunities, it is to be understood that analogous techniques additionally apply to frequency-domain scheduling as described with reference to FIG. 5 or other domains such as the code domain.

After dividing the UEs 115 into groups, base station 105-a may communicate a scheduling parameter to each UE 115 indicating its transmission opportunity pattern. For example, the scheduling parameter may indicate the periodicity with which the scheduling pattern repeats and/or signal the offset(s) within the periodic pattern for the resources assigned to each UE 115. In another example, the scheduled resource offsets may be determined by each UE 115 based on a specific parameter assigned to the UE 115 (such as a cyclic shift offset) and the total number of UEs 115 in the schedule. In some cases, the cyclic shift offset may optionally be derived from an identifier that is assigned to the UE 115 (e.g., during an association procedure or otherwise).

In some cases, one or more of the UE groupings may be skipped. Additionally, base station 105-a may signal which UE groupings will be active and which UE groupings will be skipped. Such techniques may allow for the diversification among the different pairs of UEs 115 to be performed in a selective manner. For example, base station 105-a may determine that transmissions from two UEs 115 (e.g., UE 115-b and UE 115-e) are likely to collide and refrain from allocating resources to this pairing because of the likelihood of collision. In some such cases, base station 105-a may indicate (e.g., explicitly or implicitly) which groupings are to be skipped. Additionally or alternatively, a UE 115 such as UE 115-b may determine an interference metric between its transmissions and those of another UE 115 (e.g., UE 115-e) and identify that it will not be grouped with UE 115-e based at least in part on the interference metric.

Such techniques may provide multiple benefits to wireless communications system 200. For example, the proposed transmission opportunity pattern may improve the interference diversity for uplink transmissions (e.g., grant-free uplink transmissions) within the time domain with minimal impact on communication latency. Specifically, the proposed scheme may ensure that the largest gap (e.g., in time or frequency), or worst-case delay, between successive opportunities for any given UE 115 is $$\frac{N}{2} + 1$$

where N may be the number of UEs 115 in the system and the group size may be two. Such a gap guarantee compares favorably with the relatively simple solution introduced above in which the UEs 115 may be statically coupled and base station 105-a simply cycles through these pairs. Additionally, the proposed scheme ensures that the schedule cycles through all (e.g., or almost all in the case of selective coupling based on interference metrics) combinations of UEs 115 before repeating the pattern, which may improve system performance in terms of reducing collisions without compromising efficiency.

As described further below, the described techniques may apply to time-domain resource allocation, frequency-domain resource allocation, code-domain resource allocation, reference signal transmissions, etc. For example, for SRS there may be a need to schedule a sounding opportunity for each UE 115 within a set of constraints including interference diversity, sounding frequency, and limited resource overlap. Aspects of the present disclosure may be applicable to the problem of multiplexing sounding opportunities among UEs 115 for uplink channel sounding. Additionally or alternatively, the property of having a small gap between successive transmissions which provides low latency in the time domain may be applied in the frequency domain, which may produce a transmission that is evenly spread out in frequency. For example, instead of utilizing time slot indices, the techniques described herein may utilize resource block indices. Such properties may be useful for channel SRSs, since they improve the accuracy of channel estimation by interpolation. These benefits are provided for the sake of example and are not limiting of scope. Other transmissions which balance communication latency with various performance metrics may experience similar benefits.

FIG. 3 illustrates an example of a resource allocation grid 300 that supports resource patterns for uplink transmissions in accordance with various aspects of the present disclosure. In some examples, resource allocation grid 300 may implement aspects of wireless communications system 100 or wireless communications system 200. For example, resource allocation grid 300 may apply to UE 115-a, UE 115-b, UE 115-c, UE 115-d, UE 115-e, and UE 115-f, each of which may be an example of the corresponding device described with reference to wireless communications system 200.

As illustrated by resource allocation grid 300, each UE 115 has a maximum of four offsets between successive transmission opportunities. The resource offsets may refer to timing offsets (e.g., where each offset may be in reference to a periodicity of a given scheduling pattern as described with reference to FIG. 4) or to frequency-based offsets, as described with reference to FIG. 5. Resource allocation grid 300 may be obtained by dividing M slots into N−1 blocks, where each block contains N/2 slots. In these relationships, M refers to the number of resource offsets (e.g., fifteen for the case of six UEs 115 divided into pairs) and N refers to the number of UEs 115 (e.g., six in the present example). A network device (e.g., a base station 105) may then schedule UE 115-a in slot 0 of each block, may schedule UE 115-b in slot $k_j$ of block j, where $k_j$ is specified by Table 1. Analogous scheduling techniques may be used for UE 115-c, UE 115-d, UE 115-e, and UE 115-f (e.g., using a different set of cyclic shift offsets for each UE 115 than that indicated in Table 1, where the slot index values of Table 1 for a particular number of UEs N may be considered a base sequence).

TABLE 1

| | | | Resource Index Allocation | | | | | |
|---|---|---|---|---|---|---|---|---|
| Block (j) | 0 | 1 | ... | $\frac{N}{2}-2$ | $\frac{N}{2}-1$ | $\frac{N}{2}$ | $\frac{N}{2}+1$ | ... | N-2 |
| Slot index within $j^{th}$ block ($k_j$) | 0 | 1 | ... | $\frac{N}{2}-2$ | $\frac{N}{2}-1$ | $\frac{N}{2}-1$ | $\frac{N}{2}-2$ | ... | 1 |

For example, in the case of six UEs 115, the 15-slot transmission period may be divided into five 3-slot blocks. UE 115-a may use slot offsets {0, 0, 0, 0, 0} within each respective 3-slot block. UE 115-b may use slot offsets {0, 1, 2, 2, 1} within each respective 3-slot block (e.g., the first resource allocation may be at the first slot of the first 3-slot block, the second resource allocation may be at the second slot of the second 3-slot block, the third resource allocation may be at the third slot of the third 3-slot block, the fourth resource allocation may be at the third slot of the fourth 3-slot block, and the fifth resource allocation may be at the second slot of the fifth 3-slot block). In some cases, the slot offsets may be based on a base sequence, such as the sequence shown in Table 1, and different UEs may use different cyclic shifts of the base sequence. For example, UE 115-b may have a cyclic shift offset of 0 and use slot offsets that are the same as the base sequence {0,1,2,2,1}. UE 115-c may use slot offsets {1, 0, 1, 2, 2} within each respective 3-slot block (e.g., based on applying a cyclic shift to Table 1 using a cyclic shift offset). UE 115-c may have a cyclic shift offset of 1 (e.g., because the slot offsets of UE 115-c may be a shifted version of the base sequence by one). Thus, the set of slot offsets used by UE 115-b and UE 115-c with respect to the 3-slot blocks may be cyclic shifts of each other, even though the resource allocations for different UEs 115 viewed in terms of the 15-slot transmission period may not be cyclic shifts of each other. Using the sets of slot offsets provided above, UE 115-a may use resources indexed {0, 3, 6, 9, 12}, UE 115-b may use resources indexed {0, 4, 8, 11, 13} within the 15-slot transmission period while UE 115-c may use resources indexed {1, 3, 7, 11, 14}.

Additionally or alternatively, UEs 115 may use a gap offsets, where the gap offset may be the distance (e.g., the number of slots) between each resource allocation. UE 115-a may use gap offset {2, 2, 2, 2, 2}. UE 115-b may use gap offset {3, 3, 2, 1, 1} (e.g., from the first resource allocation of UE 115-b, there is a gap of 3 slots to the second resource allocation of UE 115-b, from the second resource allocation, there is a gap of 3 slots to the third resource allocation of UE 115-b, and so on). The last number of the gap offset (e.g., 1 for UE 115-b) may represent the addition of the slots from the last resource allocation until the end of the last 3-slot block with the slots from the start of the first 3-slot block to the first resource allocation (e.g., there is 1 slot from the last resource of UE 115-b to the end of the last 3-block slot and 0 slots from the start of the first 3-slot block to the first resource allocation of UE 115-b, so the last number of the gap offset for UE 115-b is 0+1=1). UE 115-c may use gap offset {1, 3, 3, 2, 1}, UE 115-d may use gap offset {1, 1, 3, 3, 2,}UE 115-e may use gap offset {2, 1, 1, 3, 3} and UE 115-f may use gap offset {3, 2, 1, 1, 3}. As can be seen in FIG. 3, the set of gap offsets may be cyclic shifts of each other.

Figure 4:
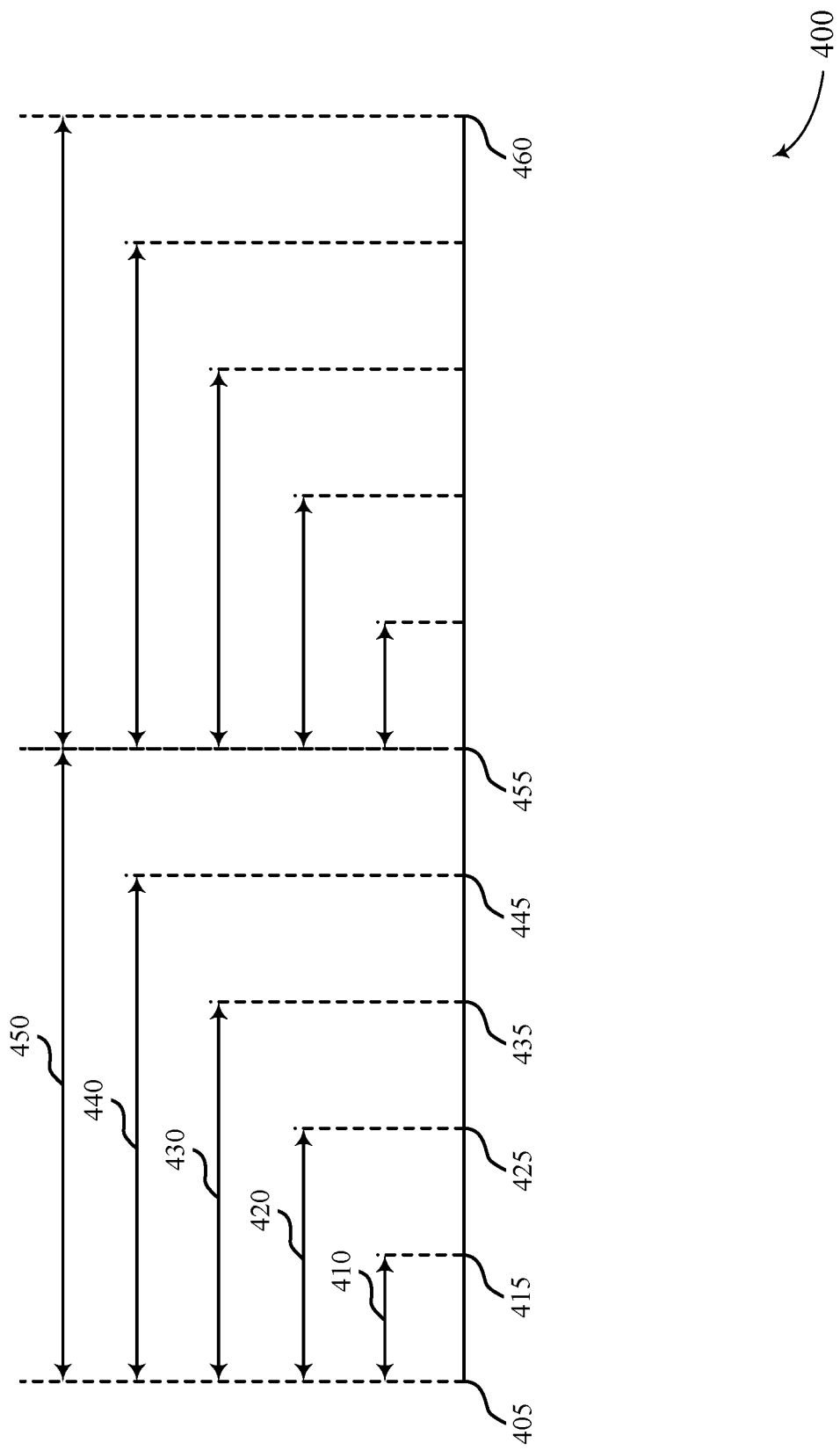
FIG. 4 illustrates an example of a timing offset scheme that supports resource patterns for uplink transmissions in accordance with aspects of the present disclosure.

FIG. 4 illustrates an example of a timing offset scheme 400 that supports resource patterns for uplink transmissions in accordance with various aspects of the present disclosure. In some examples, timing offset scheme 400 may implement aspects of wireless communications system 100 or wireless communications system 200. Timing offset scheme 400 illustrates a transmission opportunity periodicity 450 as well as four timing offsets. Transmission opportunity periodicity 450 extends from time 405 to time 455 before repeating (e.g., between time 455 and time 460). Each timing offset may be associated with a given resource offset as described with reference to FIG. 3. For example, timing offset 410 may be associated with a first resource offset of resource allocation grid 300 and may indicate that any UEs 115 associated with the first resource offset may access resources at time 415. Similar considerations may be applied for timing offset 420, timing offset 430, and timing offset 440, which may indicate that any UEs 115 associated with the given resource offsets may access resources at time 425, time 425, and time 445, respectively. In some examples, the same UE 115 may be assigned multiple timing offsets within a given transmission opportunity period.

Figure 5:
FIG. 5 illustrates an example of a resource offset scheme that supports resource patterns for uplink transmissions in accordance with aspects of the present disclosure.
Figure 5:
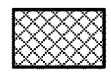
Figure 5:
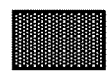
Figure 5:
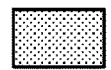
Figure 5:
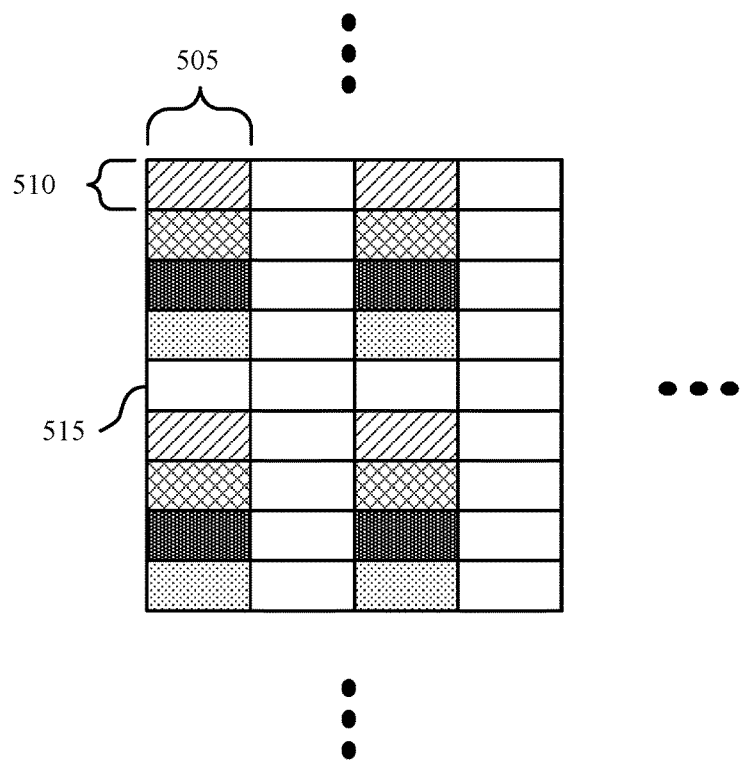

FIG. 5 illustrates an example of a resource offset scheme 500 that supports resource patterns for uplink transmissions in accordance with various aspects of the present disclosure. In some examples, resource offset scheme 500 may implement aspects of wireless communications system 100 or wireless communications system 200. Resource offset scheme 500 is organized into a group of resource blocks 515, each of which may span a set 510 of twelve subcarriers in frequency and one slot 505 in time. It is to be understood that these frequency and time divisions are included for the sake of explanation and are not limiting of scope. Any suitable time-frequency divisions may be used without deviating from the scope of the present disclosure.

As illustrated by resource offset scheme 500, resource blocks 515 may be allocated to group 1, group 2, group 3, or group 4 (e.g., or none of these groups) in a repeating fashion (e.g., according to some transmission opportunity period). Each of these groups may include multiple UEs 115

(e.g., a pair of UEs 115) which may be determined using techniques discussed above. In the context of resource offset scheme 500, resource blocks 515 within a given slot 505 or across slots 505 may be sequentially allocated to the groups (e.g., based on a resource offset as described with reference to resource allocation grid 300). For example, the resource offset may indicate a resource block 515 index (e.g., or a set of resource block 515 indices) associated with the given group of UEs 115. In some cases, the indication may be explicit (e.g., may signal which resource blocks 515 to use) or may be implicit (e.g., may provide information from which each UE 115 may determine the resource blocks 515 intended for it). Examples of such implicit information include a number of UEs 115 in the schedule, a number of UEs 115 in each group, etc. That is, each resource may in some cases be the intersection of a time-domain unit (e.g., a slot 505, a subframe, a symbol period, etc.) and a frequency-domain unit (e.g., a subcarrier, a group of subcarriers, etc.), and the sequencing order of these resources may be time-first (e.g., where resources may be sequentially indexed within a given time-domain unit before proceeding to the next time-domain unit) or may be frequency-first (e.g., where resources may be sequentially indexed within a given frequency-domain unit before proceeding to the next frequency-domain unit).

Using techniques illustrated with respect to resource offset scheme 500, a base station 105 may, for example, provide UEs 115 with transmission resources that are approximately evenly distributed in frequency, which may provide various benefits described herein. That is, the pattern of allocated resources may deviate from a rigorously evenly spaced pattern up to a limited extent (i.e., the jitter in gap spacing of the pattern may be limited). In some examples, the techniques described with reference to timing offset scheme 400 and resource offset scheme 500 may be combined to provide for resource allocations which cycle through transmission opportunities in both time and frequency. The described techniques may be further extended to other domains (e.g., the code domain) to provide for additional flexibility in allocating the resources.

Figure 6:
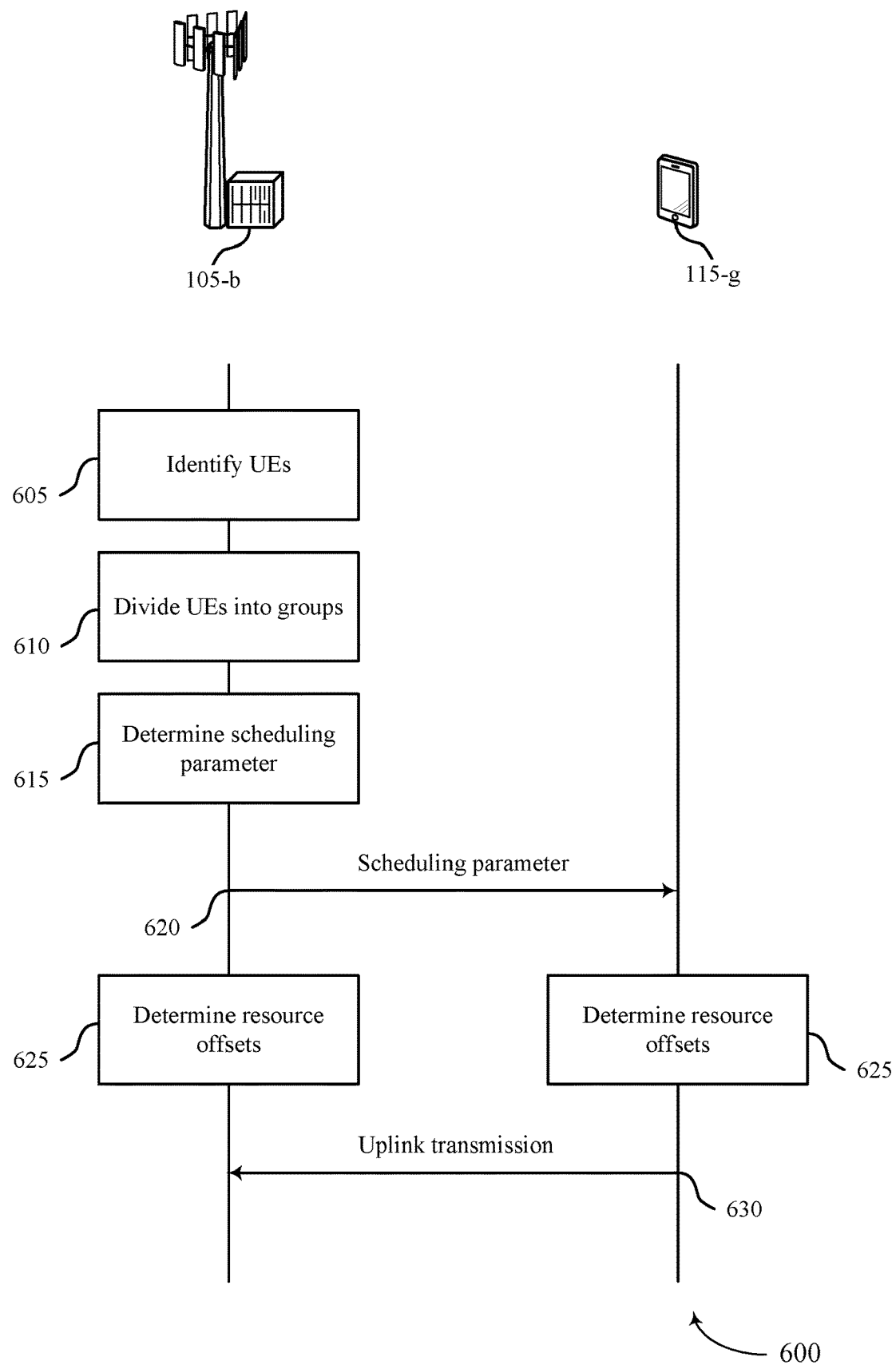
FIG. 6 illustrates an example of a process flow that supports resource patterns for uplink transmissions in accordance with aspects of the present disclosure.

FIG. 6 illustrates an example of a process flow 600 that supports resource patterns for uplink transmissions in accordance with various aspects of the present disclosure. In some examples, process flow 600 may implement aspects of wireless communications system 100. Process flow 600 includes UE 115-g and base station 105-b, each of which may be an example of the corresponding device described with reference to FIG. 1. Though illustrated in the context of a single base station 105-b and a single UE 115-g, it is to be understood that base station 105-b may be in communication with multiple UEs 115 (e.g., as described with reference to FIG. 2).

At 605, base station 105-b may identify UEs 115 (including UE 115-g) associated with a transmission opportunity period. For example, the identified UEs 115 may include the UEs 115 within a geographic coverage area of base station 105-b or some subset thereof. The identified UEs may, for example, be limited to UEs 115 that are active in terms of data traffic activity.

At 610, base station 105-b may divide the UEs 115 into a set of groups, where each group may be associated with a respective resource offset. In some cases, the set of groups may include every possible pairing (e.g., or other grouping) of UEs 115. For example, dividing the UEs into groups may be performed using techniques similar or identical to those described with reference to FIG. 3 (e.g., and specifically with reference to Table 1). In some cases, the size of the groups may be based at least in part on a target latency metric. For example, in cases in which decreased latency is prioritized, the group size may be increased (e.g., which my increase the probability of collisions).

At 615, base station 105-b may determine a scheduling parameter for each UE 115 of the identified UEs 115 based at least in part on a number of UEs 115 in the set of identified UEs 115.

At 620, base station 105-b may transmit (e.g., and UE 115-g may receive) the scheduling parameter specific to UE 115-g. For example, the scheduling parameter may include an explicit indication of a set of resource offsets for UE 115-g. Additionally or alternatively, the scheduling parameter may include a first explicit indication of a number of UEs 115 associated with the transmission opportunity period, a second explicit indication of a number of resource offsets for UE 115-g, or both. In some cases, the scheduling parameter includes an index of a look-up table, where the index indicates a number of UEs 115 associated with the transmission opportunity period, a number of resource offsets for UE 115-g, or both. In some cases, the scheduling parameter includes a first explicit indication of a periodicity of the transmission opportunity period, a second explicit indication of the resource offsets for UE 115-g, or both.

At 625, UE 115-g and base station 105-b may determine resource offsets for UE 115-g. In some cases, determining the resource offsets includes determining a set of resource block indices of the transmission opportunity period (e.g., as described with reference to FIG. 5). In some cases, UE 115-g may determine the resource offsets based at least in part on determining a number of UEs 115 associated with the transmission opportunity period (e.g., which may be implicitly or explicitly indicated by the scheduling parameter). In some examples, UE 115-g may determine a periodicity of the transmission opportunity period based on the scheduling parameter and determine a set of transmission resources based on the determined periodicity and its resource offsets (e.g., indicated by the scheduling parameter). Similarly, UE 115-g may determine its cyclic shift offset (e.g., based on an identifier UE 115-g receives during association or the like), which may factor into the resource offset determination (e.g., as described with reference to Table 1). In some cases, UE 115-g may optionally identify an interference metric for at least one other UE associated with the transmission opportunity period, where the resource offsets may be determined based at least in part on the interference metric. That is, UE 115-g may identify that its transmissions are likely to collide with at least one other UE 115 and determine that it should not attempt to access transmission resources associated with this other UE 115.

At 630, UE 115-g may transmit (and base station 105-b may receive) an uplink transmission using the set of transmission resources associated with the resource offsets determined at 625. For example, the uplink transmission may include a SRS transmission, a SR transmission, or a data transmission (e.g., a grant-free uplink transmission). Though described in the context of uplink transmissions, analogous techniques may be performed for resource allocation for UEs 115 engaging in sidelink communication.

Figure 7:
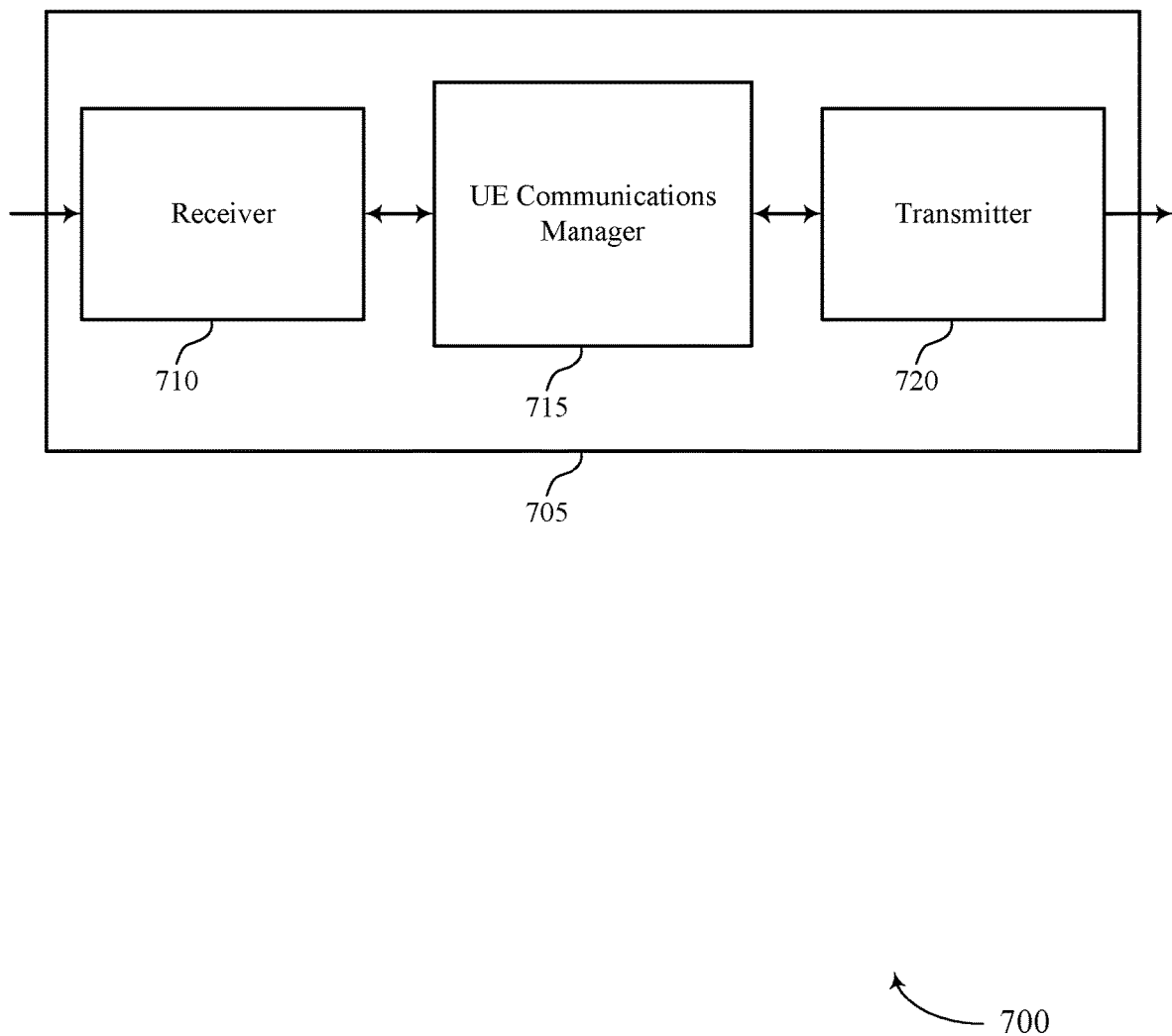
FIG. 7 shows a block diagram of a wireless device that supports resource patterns for uplink transmissions in accordance with aspects of the present disclosure.

FIG. 7 shows a block diagram 700 of a wireless device 705 that supports resource patterns for uplink transmissions in accordance with aspects of the present disclosure. Wireless device 705 may be an example of aspects of a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to resource patterns for uplink transmissions, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10. UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may receive, from a base station 105, a scheduling parameter associated with a transmission opportunity period. UE communications manager 715 may determine, based on the scheduling parameter, a set of resource offsets for the UE 115, where each resource offset of the set of resource offsets may include a timing offset. UE communications manager 715 may perform an uplink transmission using a set of transmission resources associated with the set of resource offsets.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
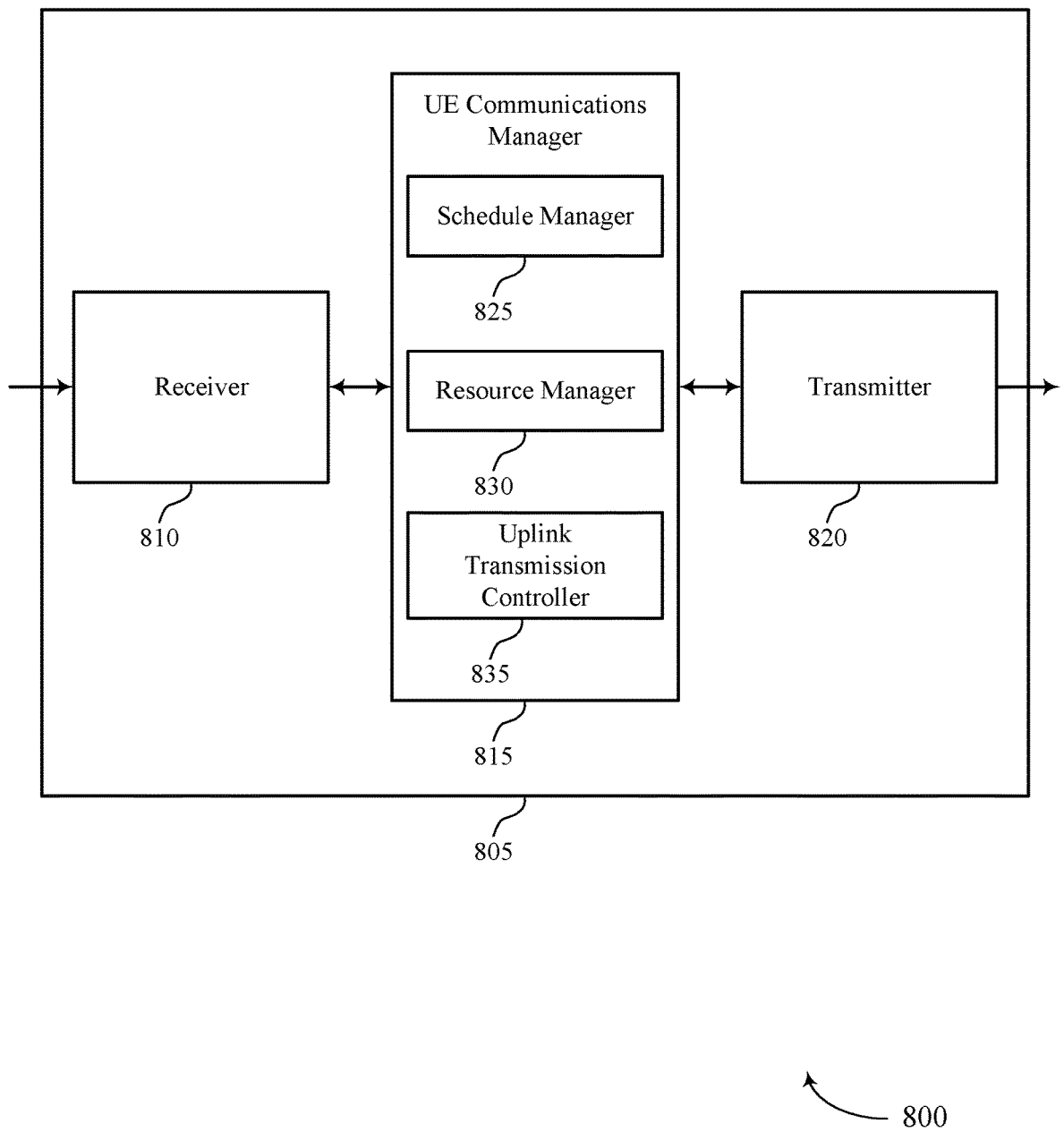
FIG. 8 shows a block diagram of a wireless device that supports resource patterns for uplink transmissions in accordance with aspects of the present disclosure.

FIG. 8 shows a block diagram 800 of a wireless device 805 that supports resource patterns for uplink transmissions in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to resource patterns for uplink transmissions, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10. UE communications manager 815 may also include schedule manager 825, resource manager 830, and uplink transmission controller 835.

Schedule manager 825 may receive, from a base station 105, a scheduling parameter associated with a transmission opportunity period. Schedule manager 825 may in some cases determine a periodicity of the transmission opportunity period based on the scheduling parameter. Schedule manager 825 may determine a number of UEs 115 associated with the transmission opportunity period based on the scheduling parameter. In some examples, schedule manager 825 may determine a cyclic shift offset associated with the UE 115. Schedule manager 825 may identify an interference metric for at least one other UE 115 associated with the transmission opportunity period, where the set of resource offsets is determined based on the interference metric. In some cases, the scheduling parameter includes an explicit indication of the set of resource offsets for the UE 115. In some cases, the scheduling parameter includes a first explicit indication of a number of UEs 115 associated with the transmission opportunity period, a second explicit indication of a number of the set of resource offsets, or both. In some cases, the scheduling parameter includes an index of a look-up table, the index indicating a number of UEs 115 associated with the transmission opportunity period, a number of the set of resource offsets, or both. In some cases, the scheduling parameter includes a first explicit indication of a periodicity of the transmission opportunity period, a second explicit indication of the set of resource offsets, or both. Schedule manager 825 may determine a base sequence.

Resource manager 830 may determine, based on the scheduling parameter, a set of resource offsets for the UE 115, where each resource offset of the set of resource offsets may include a timing offset. Resource manager 830 may determine the set of transmission resources based on the periodicity of the transmission opportunity period and the set of resource offsets for the UE 115 with respect to the transmission opportunity period. In some cases, resource manager 830 may determine the set of resource offsets for the UE 115 is based on the number of UEs 115 associated with the transmission opportunity period and the determined cyclic shift offset. In some cases, determining the set of resource offsets for the UE 115 includes determining a set of resource block indices of the transmission opportunity period. In some cases, resource manager 830 may determine the set of resource offsets for the UE is based at least in part on the base sequence and the determined cyclic shift offset.

Uplink transmission controller 835 may perform an uplink transmission using a set of transmission resources associated with the set of resource offsets. In some cases, the uplink transmission includes a SRS transmission, a SR transmission, or a data transmission (e.g., a grant-free uplink transmission).

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
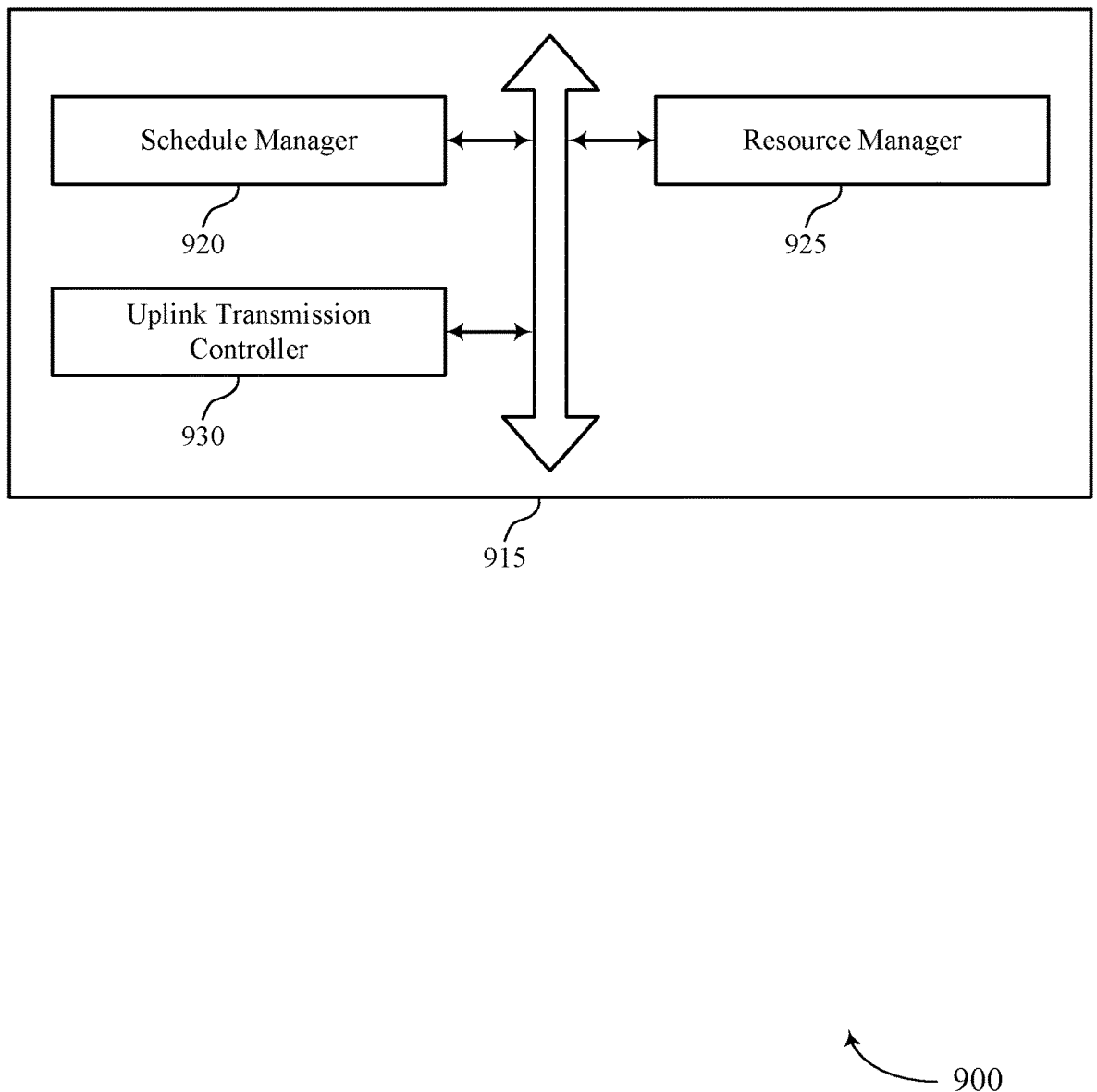
FIG. 9 shows a block diagram of a UE communications manager that supports resource patterns for uplink transmissions in accordance with aspects of the present disclosure.

FIG. 9 shows a block diagram 900 of a UE communications manager 915 that supports resource patterns for uplink transmissions in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include schedule manager 920, resource manager 925, and uplink transmission controller 930. Each of these modules may communicate, directly or indirectly, with one another (e.g., via one or more buses).

Schedule manager 920 may receive, from a base station 105, a scheduling parameter associated with a transmission opportunity period. Schedule manager 920 may determine a periodicity of the transmission opportunity period based on the scheduling parameter. Schedule manager 920 may determine a number of UEs 115 associated with the transmission opportunity period based on the scheduling parameter. Schedule manager 920 may determine a cyclic shift offset associated with the UE 115. Schedule manager 920 may identify an interference metric for at least one other UE 115 associated with the transmission opportunity period, where the set of resource offsets is determined based on the interference metric. In some cases, the scheduling parameter includes an explicit indication of the set of resource offsets for the UE 115. In some cases, the scheduling parameter includes a first explicit indication of a number of UEs 115 associated with the transmission opportunity period, a number of cyclic shifts, a periodicity of the transmission period, or a combination thereof; a second explicit indication of a number of the set of resource offsets; or both. In some cases, the scheduling parameter includes an index of a look-up table, the index indicating a number of UEs 115 associated with the transmission opportunity period, a number of the set of resource offsets, or both. In some cases, the scheduling parameter includes a first explicit indication of a periodicity of the transmission opportunity period, a second explicit indication of the set of resource offsets, or both. Schedule manager 920 may determine a base sequence (e.g., of resource offsets). In some cases, each resource offset of the set of resource offsets may include a frequency offset.

Resource manager 925 may determine, based on the scheduling parameter, a set of resource offsets for the UE 115, where each resource offset of the set of resource offsets may include a timing offset. Resource manager 925 may in some cases determine the set of transmission resources based on the periodicity of the transmission opportunity period and the set of resource offsets for the UE 115 with respect to the transmission opportunity period. Resource manager 925 may determine the set of resource offsets for the UE 115 is based on the number of UEs 115 associated with the transmission opportunity period and the determined cyclic shift offset. In some cases, determining the set of resource offsets for the UE 115 includes determining a set of resource block indices of the transmission opportunity period. In some cases, resource manager 925 may determine the set of resource offsets for the UE is based at least in part on the base sequence and the determined cyclic shift offset.

Uplink transmission controller 930 may perform an uplink transmission using a set of transmission resources associated with the set of resource offsets. In some cases, the uplink transmission includes a SRS transmission, a SR transmission, or a data transmission. In some cases, the data transmission is or includes a grant-free uplink transmission.

Figure 10:
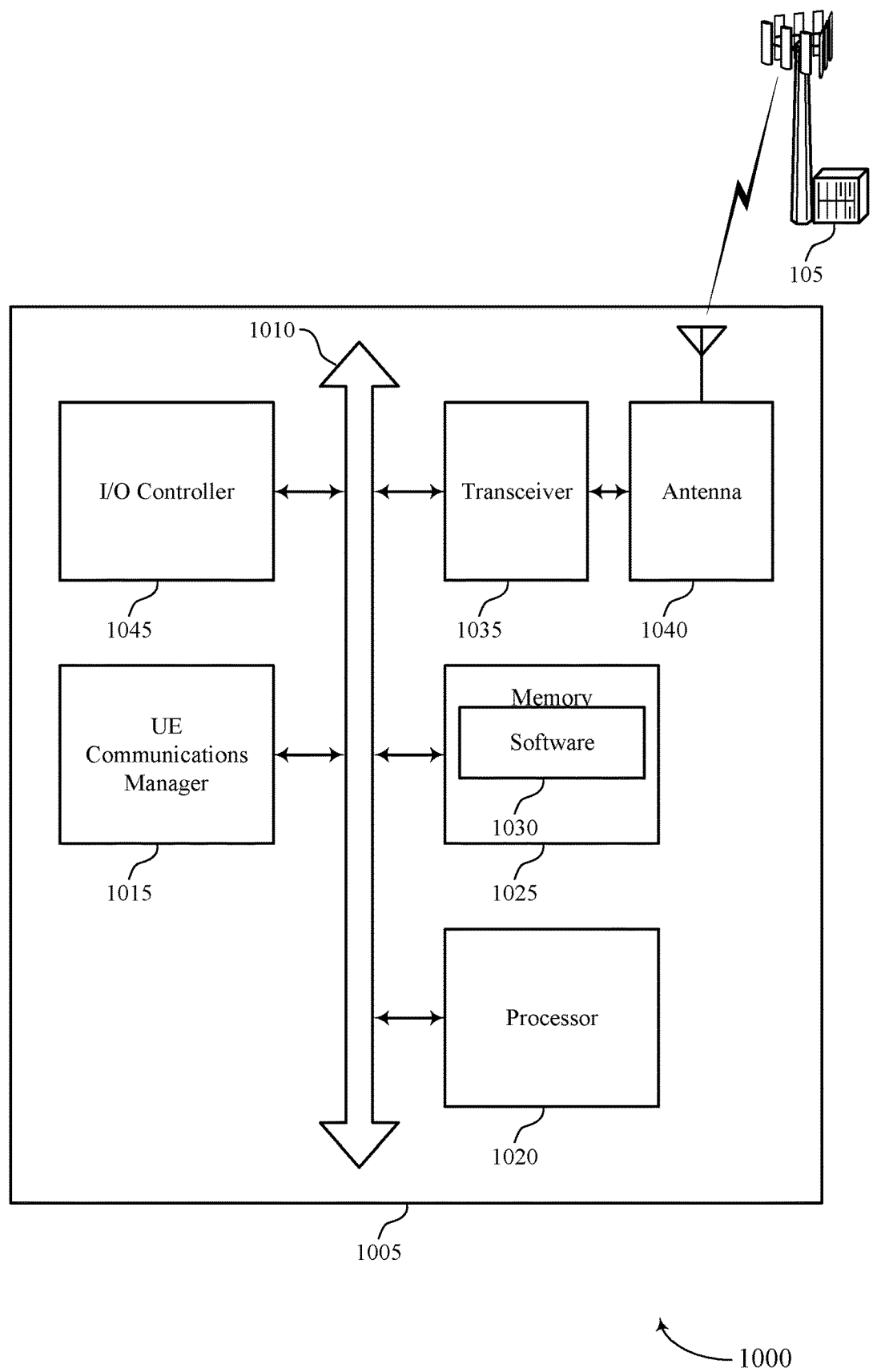
FIG. 10 shows a block diagram of a system including a wireless device that supports resource patterns for uplink transmissions in accordance with aspects of the present disclosure.

FIG. 10 shows a block diagram of a system 1000 including a wireless device 1005 that supports resource patterns for uplink transmissions in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting resource patterns for uplink transmissions).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support resource patterns for uplink transmissions. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
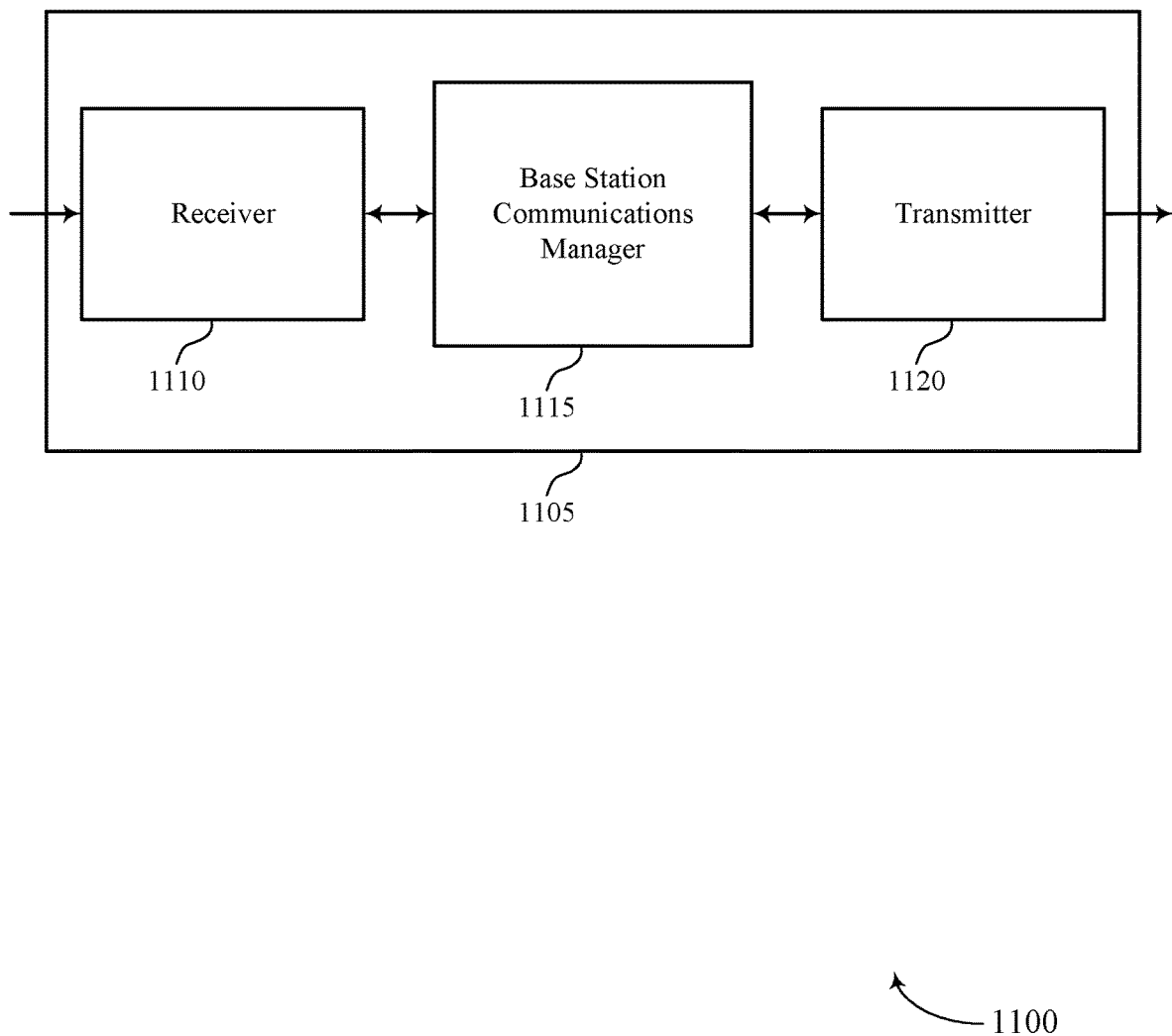
FIG. 11 shows a block diagram of a wireless device that supports resource patterns for uplink transmissions in accordance with aspects of the present disclosure.

FIG. 11 shows a block diagram 1100 of a wireless device 1105 that supports resource patterns for uplink transmissions in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to resource patterns for uplink transmissions, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14. Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may identify a set of UEs associated with a transmission opportunity period. Base station communications manager 1115 may apportion the set of UEs into a set of groups, each group associated with a respective resource offset, where each respective resource offset may include a timing offset. Base station communications manager 1115 may determine a scheduling parameter for each UE 115 of the set of UEs based on a number of UEs 115 in the set of UEs. Base station communications manager 1115 may transmit the scheduling parameter to each UE 115 of the set of UEs.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
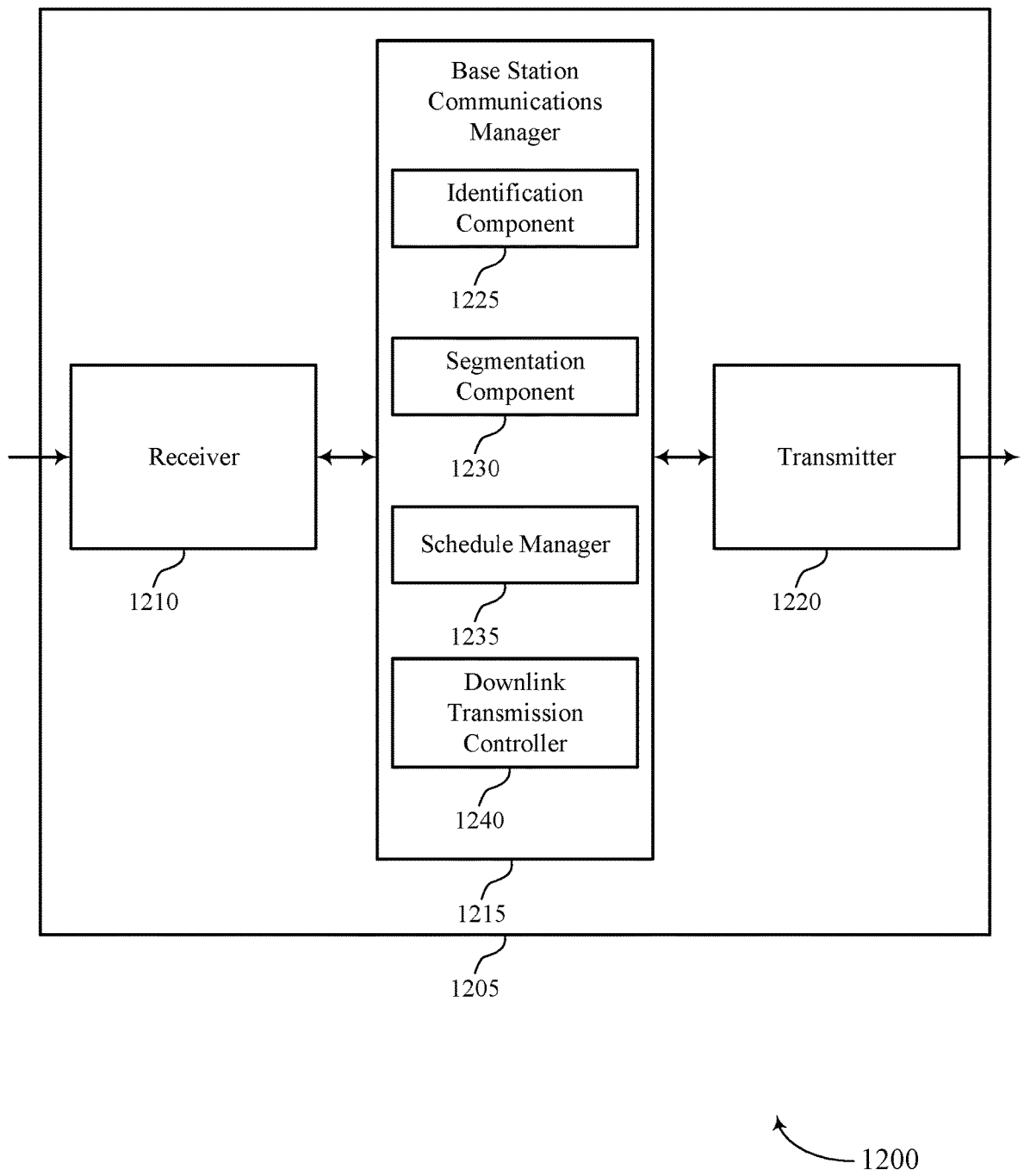
FIG. 12 shows a block diagram of a wireless device that supports resource patterns for uplink transmissions in accordance with aspects of the present disclosure.

FIG. 12 shows a block diagram 1200 of a wireless device 1205 that supports resource patterns for uplink transmissions in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to resource patterns for uplink transmissions, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14. Base station communications manager 1215 may also include identification component 1225, segmentation component 1230, schedule manager 1235, and downlink transmission controller 1240.

Identification component 1225 may identify a set of UEs associated with a transmission opportunity period.

Segmentation component 1230 may apportion the set of UEs into groups, each group associated with a respective resource offset, where each respective resource offset may include a timing offset. Segmentation component 1230 may determine an interference metric between two UEs 115 of the set of UEs, where the UEs 115 are apportioned into the groups based on the interference metric. Segmentation component 1230 may determine a latency metric for the transmission opportunity period, where the set of UEs are apportioned into the set of groups based on the latency metric. Segmentation component 1230 may determine the resource offset for each group based on the number of UEs 115 in the set of UEs. In some cases, each resource offset includes an index to a resource block of the transmission opportunity period. In some cases, each group includes a unique set of UEs (e.g., compared to the other groups). In some cases, each group of the set of groups includes a respective pair of UEs 115 of the set of UEs. In some cases, the set of groups includes each possible pair of UEs 115 of the set of UEs. In some cases, each respective resource offset may further include a frequency offset.

Schedule manager 1235 may determine a periodicity of the transmission opportunity period based on the number of UEs 115 in the set of UEs. Schedule manager 1235 may determine a base sequence of resource offsets and a cyclic shift offset for each UE of the set of UEs, where the scheduling parameter is based on the determined base sequence of resource offsets and the determined cyclic shift offset. Schedule manager 1235 may determine a number of UEs 115 in each group of the set of groups, where the scheduling parameter is based on the number of UEs 115 in the set of UEs and the number of UEs 115 in each group. Schedule manager 1235 may determine a scheduling parameter for each UE 115 of the set of UEs based on a number of UEs 115 in the set of UEs. In some cases, the scheduling parameter for each UE 115 includes an explicit indication of a set of resource offsets for the UE 115. In some cases, a scheduling parameter for a UE 115 of the set of UEs includes a first explicit indication of the number of UEs 115 associated with the transmission opportunity period, a number of cyclic shifts, a periodicity of the transmission opportunity period, or a combination thereof; a second explicit indication of a number of resource offsets for the UE 115; or both. In some cases, a scheduling parameter for a UE 115 of the set of UEs includes an index of a look-up table, the index indicating the number of UEs 115 associated with the transmission opportunity period, a number of resource offsets for the UE 115, or both. In some cases, a scheduling parameter for a UE 115 of the set of UEs includes a first explicit indication of a periodicity of the transmission opportunity period, a second explicit indication of a set of resource offsets for the UE 115, or both.

Downlink transmission controller 1240 may transmit the scheduling parameter to each UE 115 of the set of UEs. Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
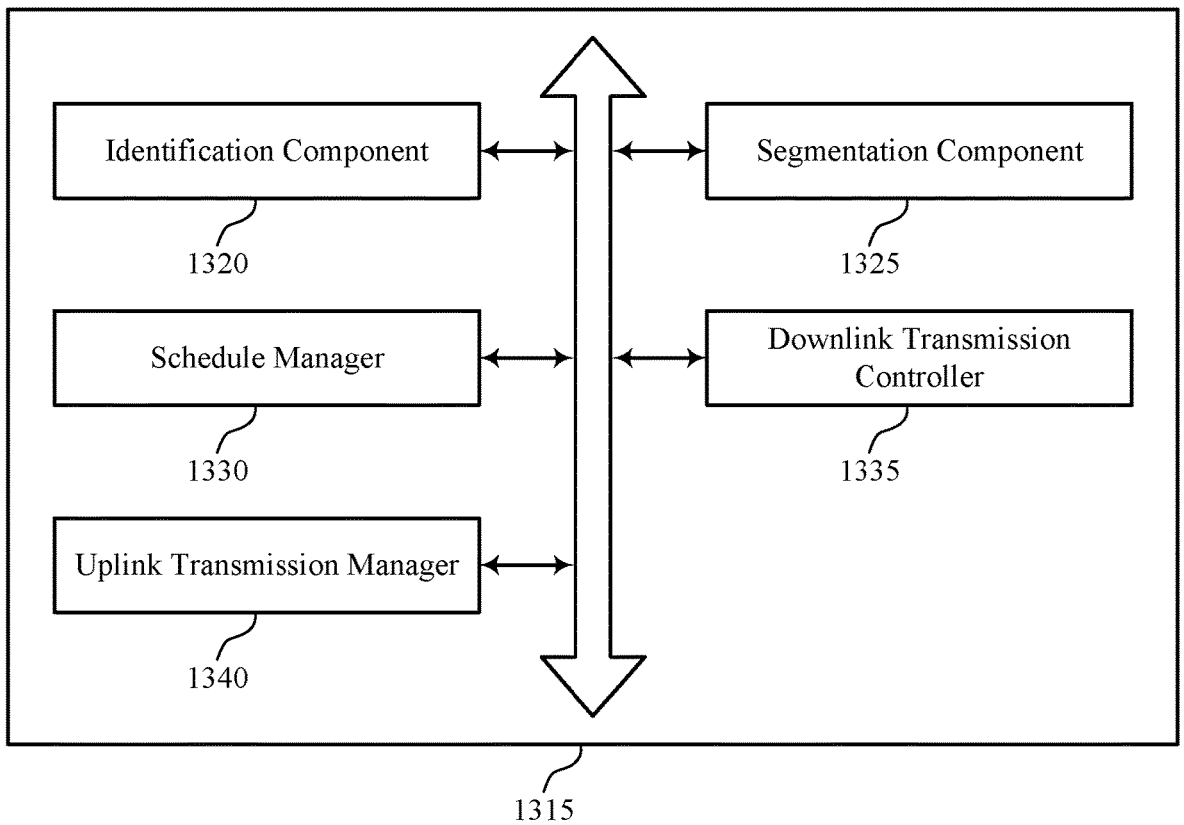
FIG. 13 shows a block diagram of a base station communications manager that supports resource patterns for uplink transmissions in accordance with aspects of the present disclosure.

FIG. 13 shows a block diagram 1300 of a base station communications manager 1315 that supports resource patterns for uplink transmissions in accordance with aspects of the present disclosure. The base station communications manager 1315 may be an example of aspects of a base station communications manager 1415 described with reference to FIGS. 11, 12, and 14. The base station communications manager 1315 may include identification component 1320, segmentation component 1325, schedule manager 1330, downlink transmission controller 1335, and uplink transmission manager 1340. Each of these modules may communicate, directly or indirectly, with one another (e.g., via one or more buses).

Identification component 1320 may identify a set of UEs associated with a transmission opportunity period.

Segmentation component 1325 may apportion the set of UEs into groups, each group associated with a respective resource offset, where each respective resource offset may include a timing offset. Segmentation component 1325 may determine an interference metric between two UEs 115 of the set of UEs, where the set of UEs are apportioned into the set of groups based on the interference metric. Segmentation component 1325 may determine a latency metric for the transmission opportunity period, where the set of UEs are apportioned into the set of groups based on the latency metric. Segmentation component 1325 may apportion the set of UEs into a set of groups, each group associated with a respective resource offset. Segmentation component 1325 may determine the resource offset for each group based on the number of UEs 115 in the set of UEs. In some cases, each resource offset includes an index to a resource block of the transmission opportunity period. In some cases, each group of the set of groups includes a unique set of UEs 115 of the set of UEs. In some cases, each group of the set of groups includes a respective pair of UEs 115 of the set of UEs. In some cases, the set of groups includes each possible pair of UEs 115 of the set of UEs.

Schedule manager 1330 may determine a periodicity of the transmission opportunity period based on the number of UEs 115 in the set of UEs. Schedule manager 1330 may determine a base sequence of resource offsets and a cyclic shift offset for each UE of the set of UEs, where the scheduling parameter is based on the determined base sequence of resource offsets and the determined cyclic shift offset. Schedule manager 1330 may determine a number of UEs 115 in each group of the set of groups, where the scheduling parameter is based on the number of UEs 115 in the set of UEs and the number of UEs 115 in each group. Schedule manager 1330 may determine a scheduling parameter for each UE 115 of the set of UEs based on a number of UEs 115 in the set of UEs. In some cases, the scheduling parameter for each UE 115 includes an explicit indication of a set of resource offsets for the UE 115. In some cases, a scheduling parameter for a UE 115 of the set of UEs includes a first explicit indication of the number of UEs 115 associated with the transmission opportunity period, a second explicit indication of a number of resource offsets for the UE 115, or both. In some cases, a scheduling parameter for a UE 115 of the set of UEs includes an index of a look-up table, the index indicating the number of UEs 115 associated with the transmission opportunity period, a number of resource offsets for the UE 115, or both. In some cases, a scheduling parameter for a UE 115 of the set of UEs includes a first explicit indication of a periodicity of the transmission opportunity period, a second explicit indication of a set of resource offsets for the UE 115, or both.

Downlink transmission controller 1335 may transmit the scheduling parameter to each UE 115 of the set of UEs. Uplink transmission manager 1340 may identify a set of transmission resources for each group based on the periodicity of the transmission opportunity period and the resource offset for the group and receive an uplink transmission over at least one set of transmission resources. In some cases, the uplink transmission includes a SRS transmission, a SR transmission, or a data transmission. In some cases, the data transmission includes a grant-free uplink transmission.

Figure 14:
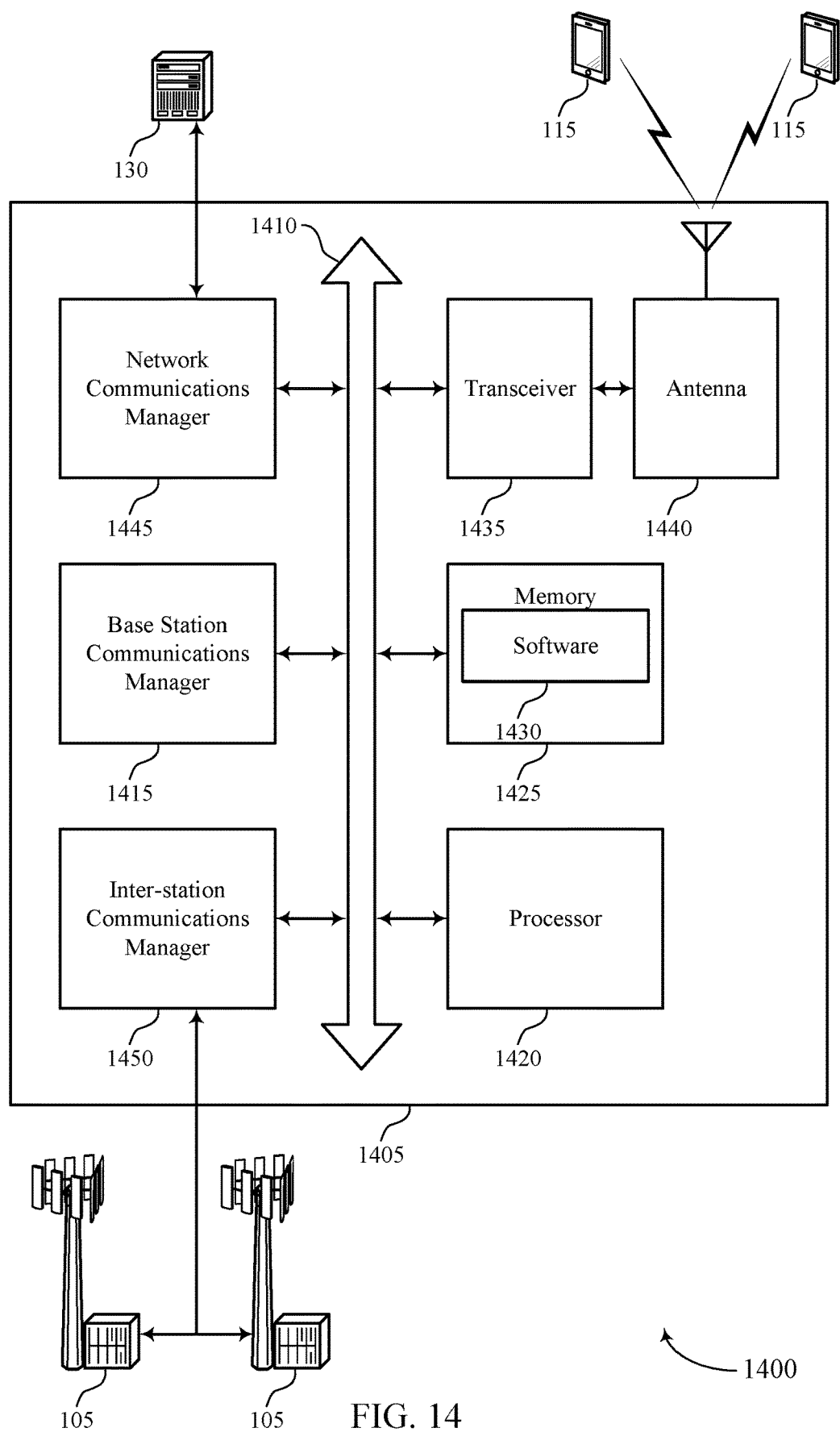
FIG. 14 illustrates a block diagram of a system including a base station that supports resource patterns for uplink transmissions in accordance with aspects of the present disclosure.

FIG. 14 shows a diagram of a system 1400 including a device 1405 that supports resource patterns for uplink transmissions in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting resource patterns for uplink transmissions).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support resource patterns for uplink transmissions. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas. In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105 and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
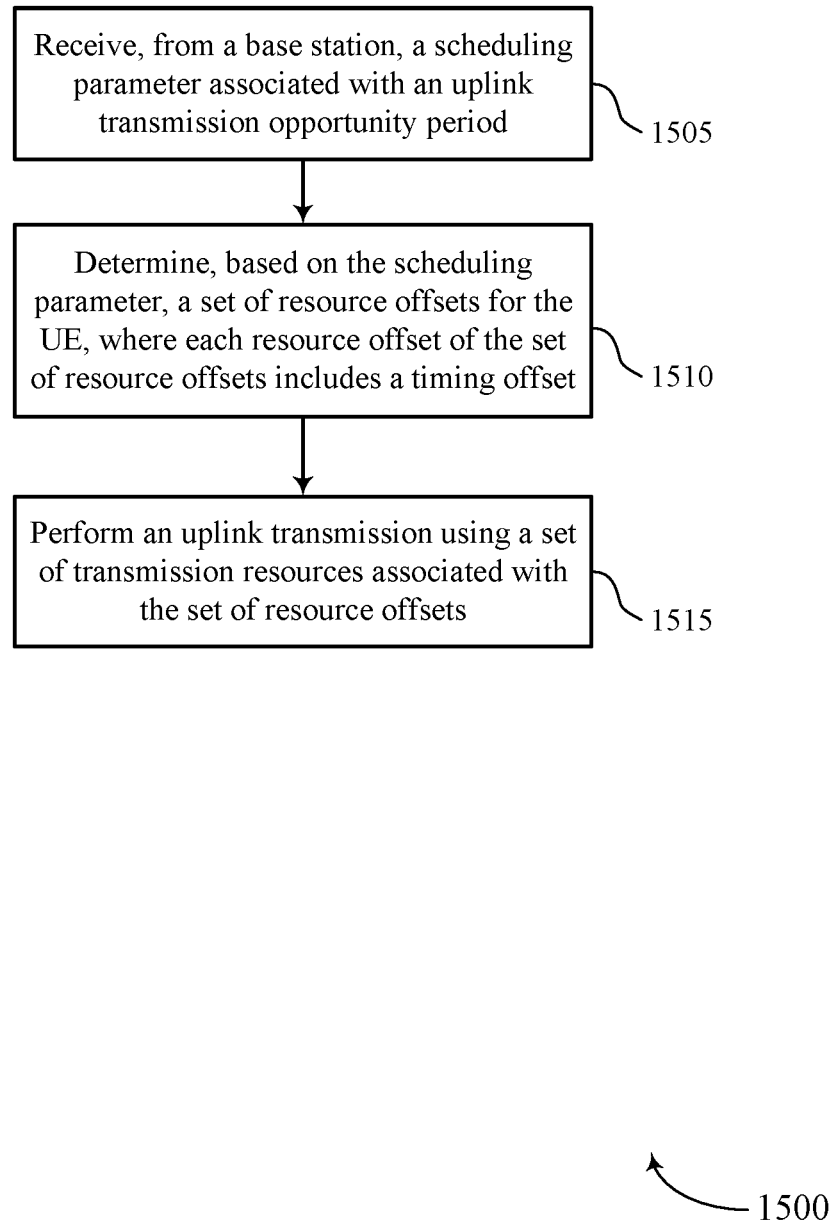
FIGS. 15 through 24 illustrate methods for resource patterns for uplink transmissions in accordance with aspects of the present disclosure.

FIG. 15 shows a flowchart illustrating a method 1500 for resource patterns for uplink transmissions in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive, from a base station 105, a scheduling parameter associated with a transmission opportunity period. The operations of 1505 may be performed according to the methods described herein. In certain examples, aspects of the operations of 1505 may be performed by a schedule manager as described with reference to FIGS. 7 through 10.

At 1510 the UE 115 may determine, based at least in part on the scheduling parameter, a set of resource offsets for the UE 115, where each resource offset of the set of resource offsets includes a timing offset. The operations of 1510 may be performed according to the methods described herein. In certain examples, aspects of the operations of 1510 may be performed by a resource manager as described with reference to FIGS. 7 through 10.

At 1515 the UE 115 may perform an uplink transmission using a set of transmission resources associated with the set of resource offsets. The operations of 1515 may be performed according to the methods described herein. In certain examples, aspects of the operations of 1515 may be performed by an uplink transmission controller as described with reference to FIGS. 7 through 10.

Figure 16:
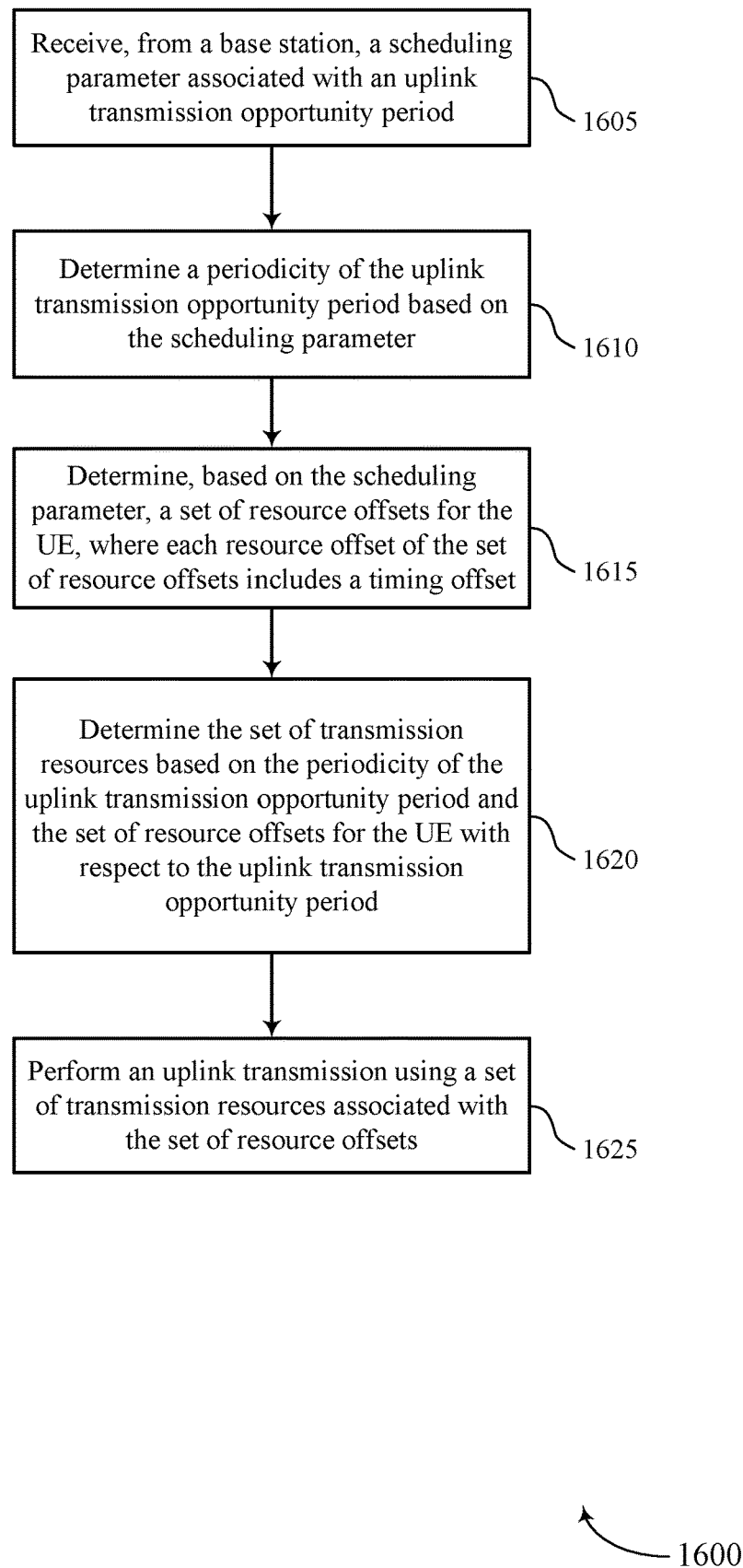

FIG. 16 shows a flowchart illustrating a method 1600 for resource patterns for uplink transmissions in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive, from a base station 105, a scheduling parameter associated with a transmission opportunity period. The operations of 1605 may be performed according to the methods described herein. In certain examples, aspects of the operations of 1605 may be performed by a schedule manager as described with reference to FIGS. 7 through 10.

At 1610 the UE 115 may determine a periodicity of the transmission opportunity period based at least in part on the scheduling parameter. The operations of 1610 may be performed according to the methods described herein. In certain examples, aspects of the operations of 1610 may be performed by a schedule manager as described with reference to FIGS. 7 through 10.

At 1615 the UE 115 may determine, based at least in part on the scheduling parameter, a set of resource offsets for the UE, where each resource offset of the set of resource offsets includes a timing offset. The operations of 1615 may be performed according to the methods described herein. In certain examples, aspects of the operations of 1615 may be performed by a resource manager as described with reference to FIGS. 7 through 10.

At 1620 the UE 115 may determine the set of transmission resources based at least in part on the periodicity of the transmission opportunity period and the set of resource offsets for the UE with respect to the transmission opportunity period. The operations of 1620 may be performed according to the methods described herein. In certain examples, aspects of the operations of 1620 may be performed by a resource manager as described with reference to FIGS. 7 through 10.

At 1625 the UE 115 may perform an uplink transmission using a set of transmission resources associated with the set of resource offsets. The operations of 1625 may be performed according to the methods described herein. In certain examples, aspects of the operations of 1625 may be performed by an uplink transmission controller as described with reference to FIGS. 7 through 10.

Figure 17:
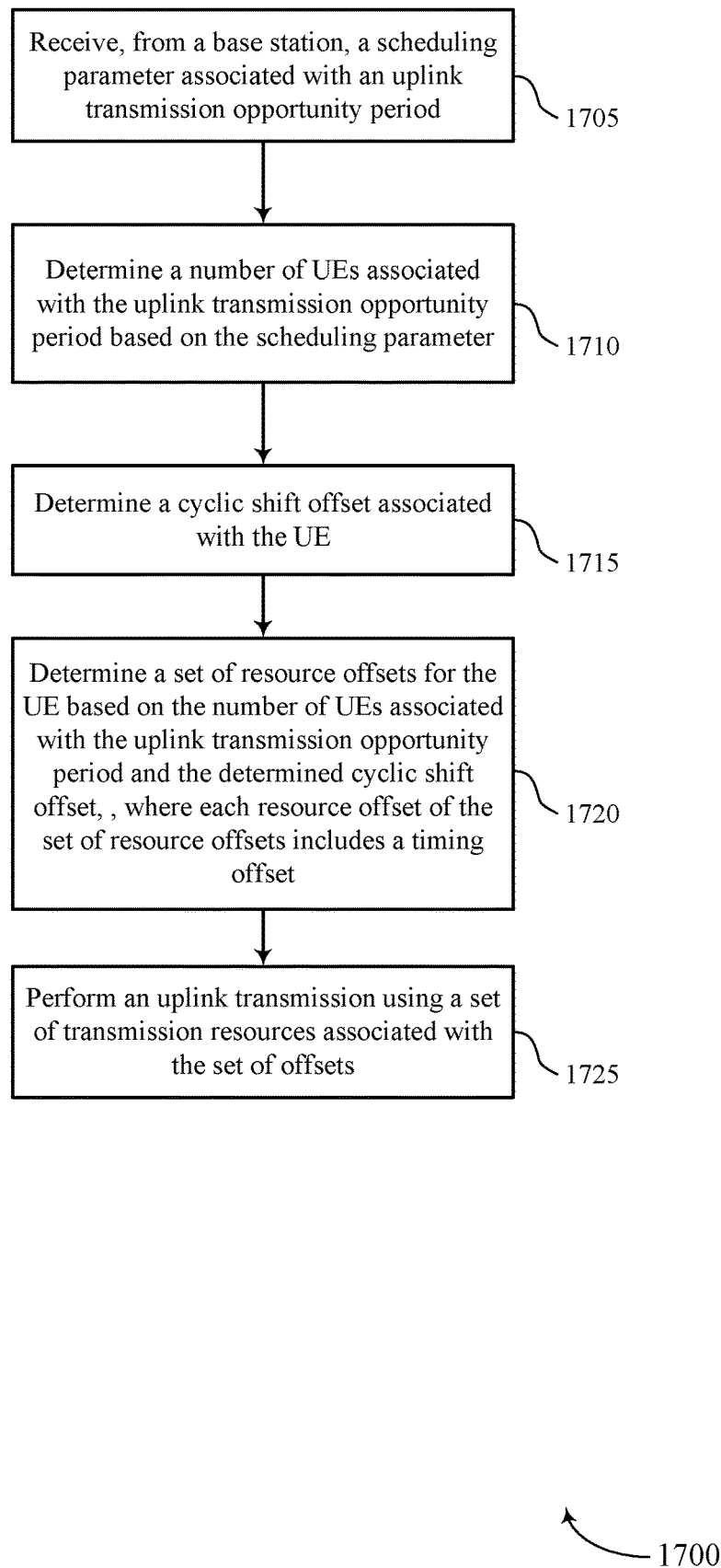

FIG. 17 shows a flowchart illustrating a method 1700 for resource patterns for uplink transmissions in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may receive, from a base station 105, a scheduling parameter associated with a transmission opportunity period. The operations of 1705 may be performed according to the methods described herein. In certain examples, aspects of the operations of 1705 may be performed by a schedule manager as described with reference to FIGS. 7 through 10.

At 1710 the UE 115 may determine a number of UEs 115 associated with the transmission opportunity period based at least in part on the scheduling parameter. The operations of 1710 may be performed according to the methods described herein. In certain examples, aspects of the operations of 1710 may be performed by a schedule manager as described with reference to FIGS. 7 through 10.

At 1715 the UE 115 may determine a cyclic shift offset associated with the UE. The operations of 1715 may be performed according to the methods described herein. In certain examples, aspects of the operations of 1715 may be performed by a schedule manager as described with reference to FIGS. 7 through 10.

At 1720 the UE 115 may determine the set of resource offsets for the UE 115 based at least in part on the number of UEs 115 associated with the transmission opportunity period and the determined cyclic shift offset, where each resource offset of the set of resource offsets includes a timing offset. The operations of 1720 may be performed according to the methods described herein. In certain examples, aspects of the operations of 1720 may be performed by a resource manager as described with reference to FIGS. 7 through 10.

At 1725 the UE 115 may perform an uplink transmission using a set of transmission resources associated with the set of resource offsets. The operations of 1725 may be performed according to the methods described herein. In certain examples, aspects of the operations of 1725 may be performed by an uplink transmission controller as described with reference to FIGS. 7 through 10.

Figure 18:
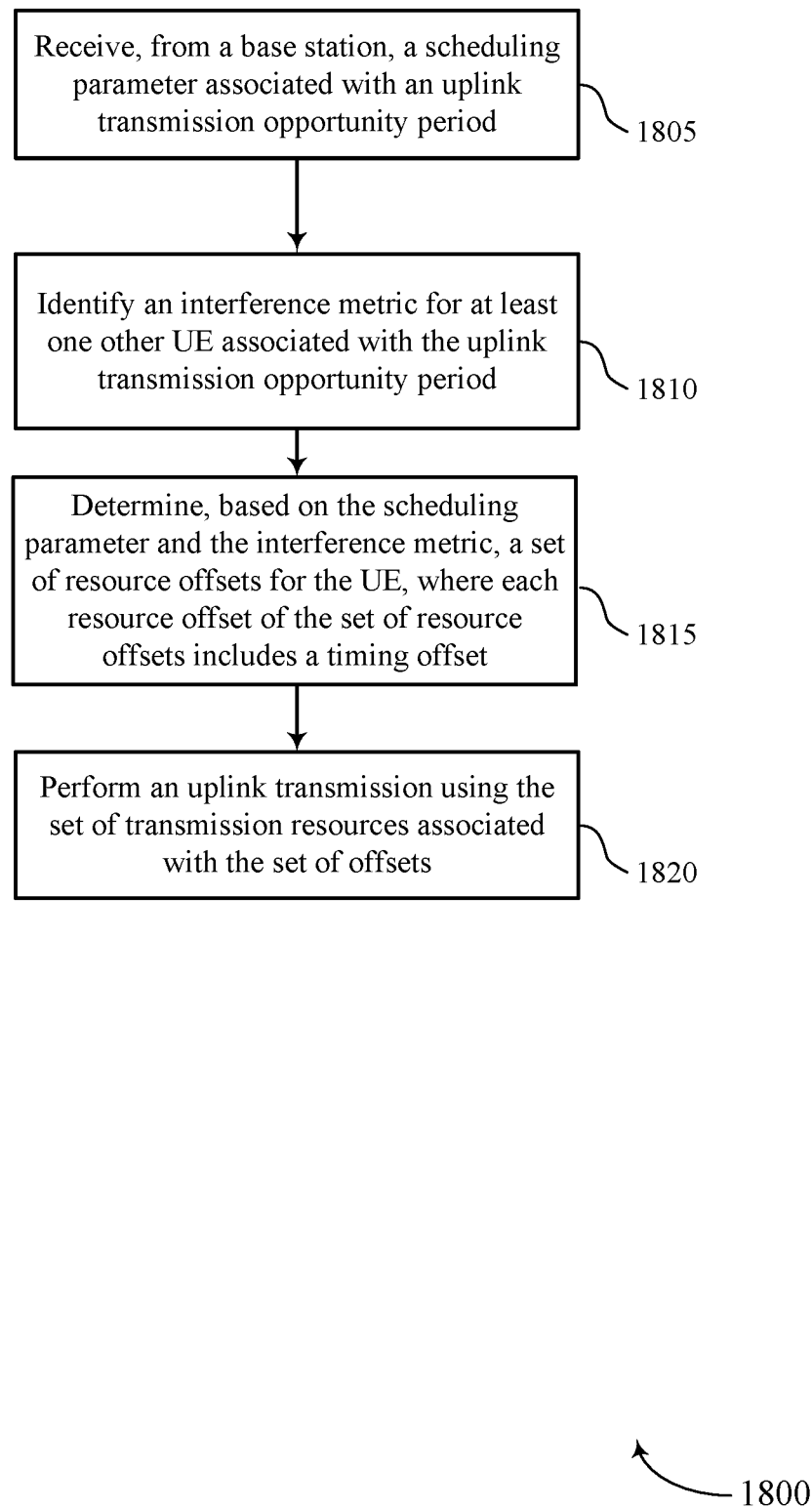

FIG. 18 shows a flowchart illustrating a method 1800 for resource patterns for uplink transmissions in accordance with aspects of the present disclosure. The operations of method 1800 may be implemented by a UE 115 or its components as described herein. For example, the operations of method 1800 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may receive, from a base station 105, a scheduling parameter associated with a transmission opportunity period. The operations of 1805 may be performed according to the methods described herein. In certain examples, aspects of the operations of 1805 may be performed by a schedule manager as described with reference to FIGS. 7 through 10.

At 1810 the UE 115 may identify an interference metric for at least one other UE 115 associated with the transmission opportunity period. The operations of 1810 may be performed according to the methods described herein. In certain examples, aspects of the operations of 1810 may be performed by a schedule manager as described with reference to FIGS. 7 through 10.

At 1815 the UE 115 may determine, based at least in part on the scheduling parameter and the interference metric, a set of resource offsets for the UE 115, where each resource offset of the set of resource offsets includes a timing offset. The operations of 1815 may be performed according to the methods described herein. In certain examples, aspects of the operations of 1815 may be performed by a resource manager as described with reference to FIGS. 7 through 10.

At 1820 the UE 115 may perform an uplink transmission using the set of transmission resources associated with the set of resource offsets. The operations of 1820 may be performed according to the methods described herein. In certain examples, aspects of the operations of 1820 may be performed by an uplink transmission controller as described with reference to FIGS. 7 through 10.

Figure 19:
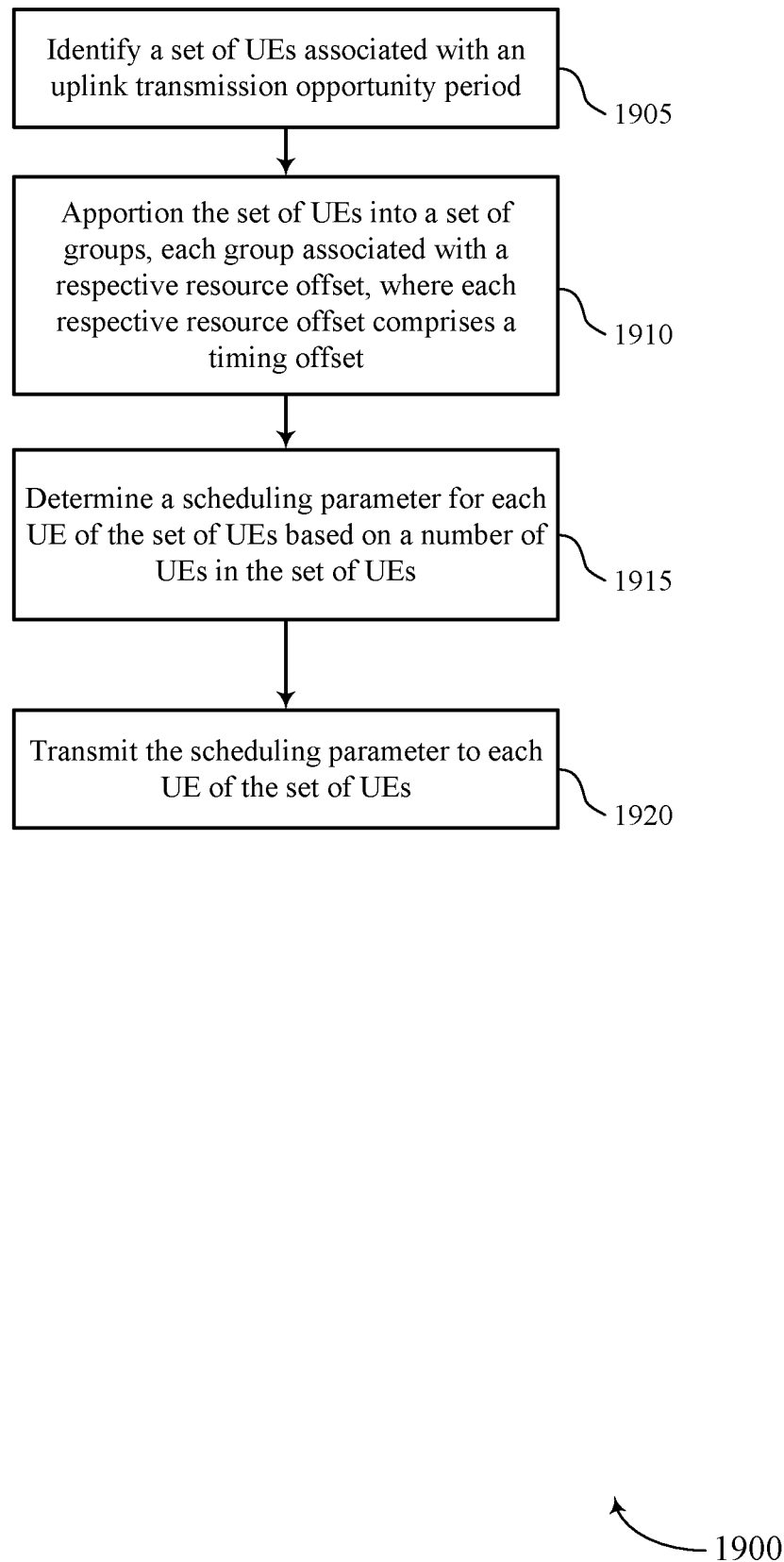

FIG. 19 shows a flowchart illustrating a method 1900 for resource patterns for uplink transmissions in accordance with aspects of the present disclosure. The operations of method 1900 may be implemented by a base station 105 or its components as described herein. For example, the operations of method 1900 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may identify a set of UEs associated with a transmission opportunity period. The operations of 1905 may be performed according to the methods described herein. In certain examples, aspects of the operations of 1905 may be performed by an identification component as described with reference to FIGS. 11 through 14.

At 1910 the base station 105 may apportion the set of UEs into a set of groups, each group associated with a respective resource offset, where each respective resource offset comprises a timing offset. The operations of 1910 may be performed according to the methods described herein. In certain examples, aspects of the operations of 1910 may be performed by a segmentation component as described with reference to FIGS. 11 through 14.

At 1915 the base station 105 may determine a scheduling parameter for each UE 115 of the set of UEs based at least in part on a number of UEs 115 in the set of UEs. The operations of 1915 may be performed according to the methods described herein. In certain examples, aspects of the operations of 1915 may be performed by a schedule manager as described with reference to FIGS. 11 through 14.

At 1920 the base station 105 may transmit the scheduling parameter to each UE 115 of the set of UEs. The operations of 1920 may be performed according to the methods described herein. In certain examples, aspects of the operations of 1920 may be performed by a downlink transmission controller as described with reference to FIGS. 11 through 14.

Figure 20:
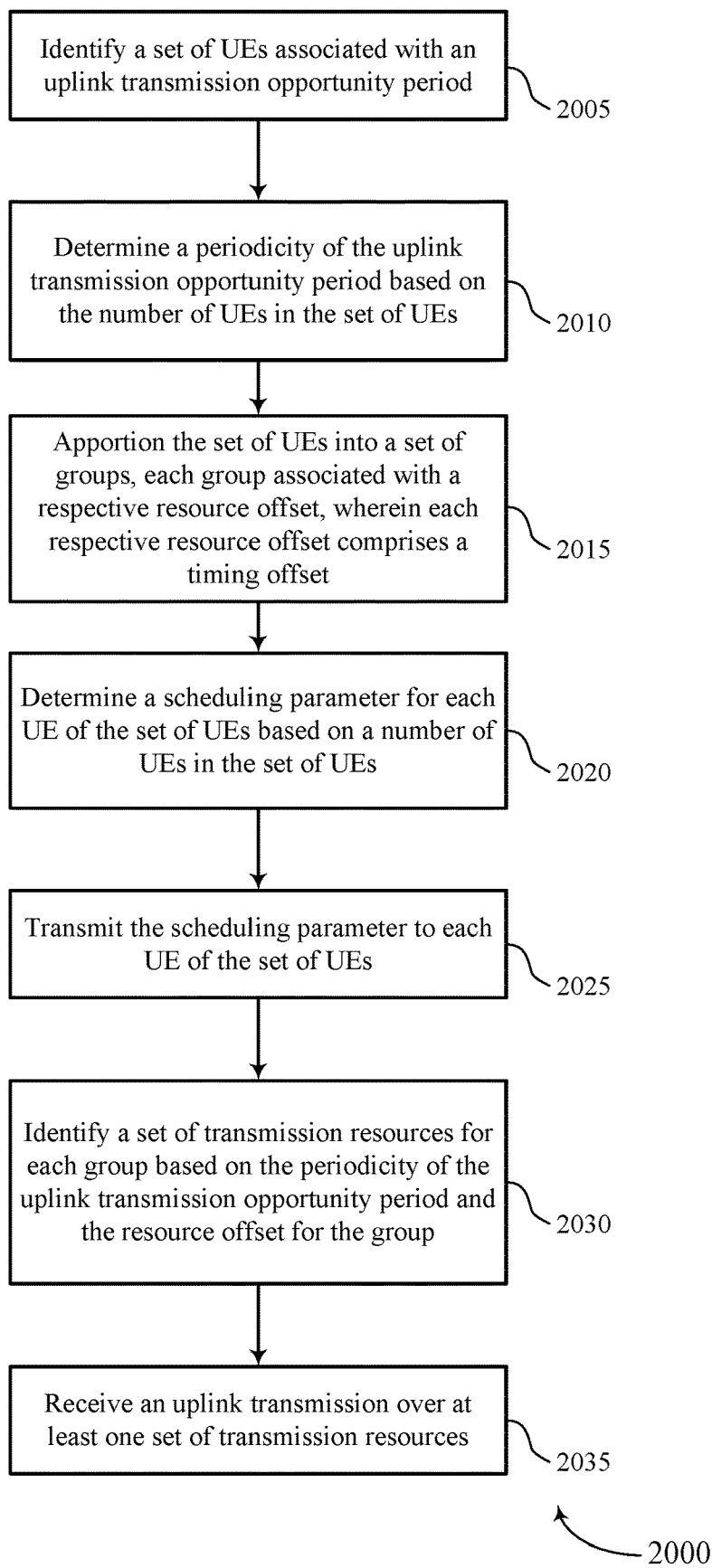

FIG. 20 shows a flowchart illustrating a method 2000 for resource patterns for uplink transmissions in accordance with aspects of the present disclosure. The operations of method 2000 may be implemented by a base station 105 or its components as described herein. For example, the operations of method 2000 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 2005 the base station 105 may identify a set of UEs associated with a transmission opportunity period. The operations of 2005 may be performed according to the methods described herein. In certain examples, aspects of the operations of 2005 may be performed by an identification component as described with reference to FIGS. 11 through 14.

At 2010 the base station 105 may determine a periodicity of the transmission opportunity period based at least in part on the number of UEs 115 in the set of UEs. The operations of 2010 may be performed according to the methods described herein. In certain examples, aspects of the operations of 2010 may be performed by a schedule manager as described with reference to FIGS. 11 through 14.

At 2015 the base station 105 may apportion the set of UEs into a set of groups, each group associated with a respective resource offset, where each respective resource offset comprises a timing offset. The operations of 2015 may be performed according to the methods described herein. In certain examples, aspects of the operations of 2015 may be performed by a segmentation component as described with reference to FIGS. 11 through 14.

At 2020 the base station 105 may determine a scheduling parameter for each UE 115 of the set of UEs based at least in part on a number of UEs 115 in the set of UEs. The operations of 2020 may be performed according to the methods described herein. In certain examples, aspects of the operations of 2020 may be performed by a schedule manager as described with reference to FIGS. 11 through 14.

At 2025 the base station 105 may transmit the scheduling parameter to each UE 115 of the set of UEs. The operations of 2025 may be performed according to the methods described herein. In certain examples, aspects of the operations of 2025 may be performed by a downlink transmission controller as described with reference to FIGS. 11 through 14.

At 2030 the base station 105 may identify a set of transmission resources for each group based at least in part on the periodicity of the transmission opportunity period and the resource offset for the group. The operations of 2030 may be performed according to the methods described herein. In certain examples, aspects of the operations of 2030 may be performed by an uplink transmission manager as described with reference to FIGS. 11 through 14.

At 2035 the base station 105 may receive an uplink transmission over at least one set of transmission resources. The operations of 2035 may be performed according to the methods described herein. In certain examples, aspects of the operations of 2035 may be performed by an uplink transmission manager as described with reference to FIGS. 11 through 14.

Figure 21:
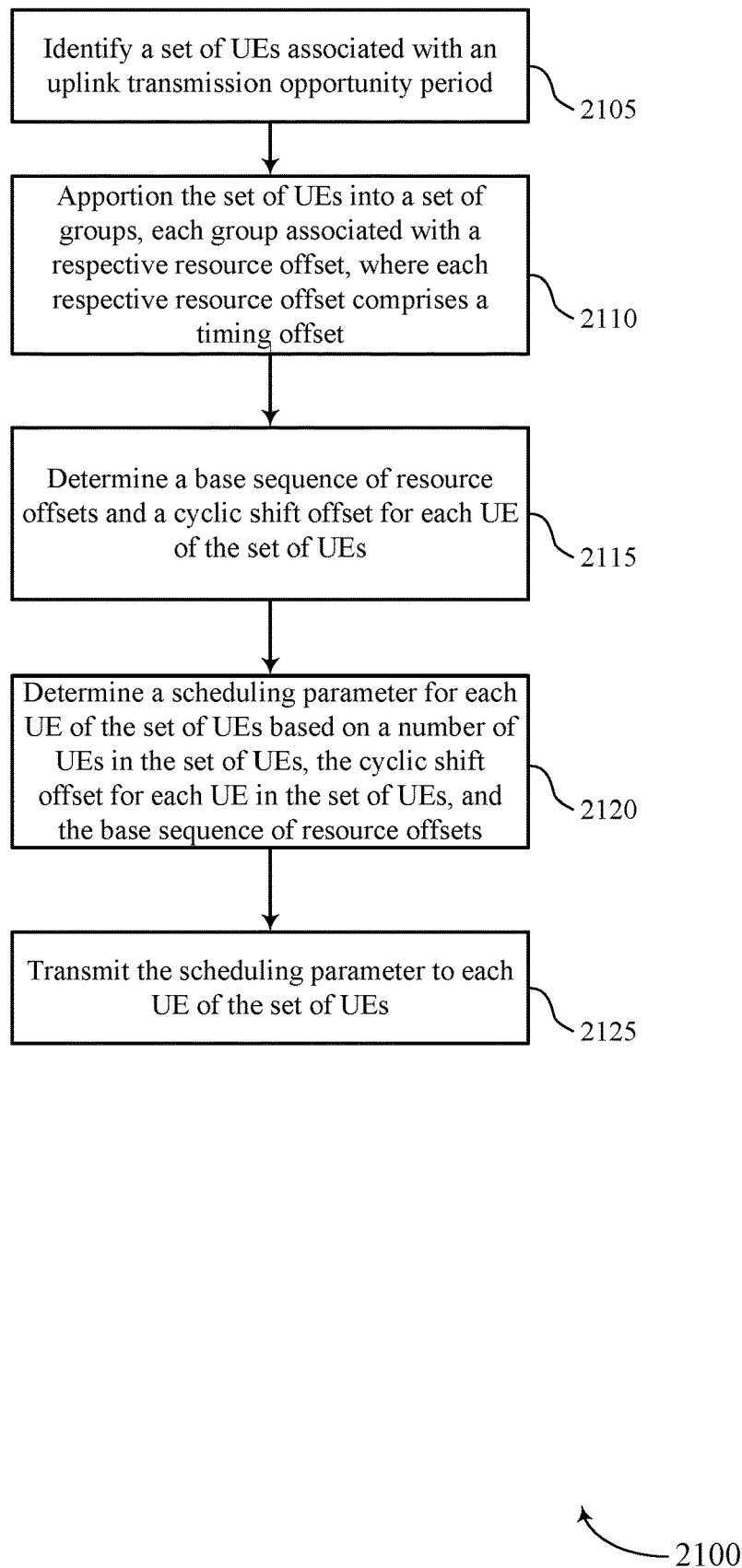

FIG. 21 shows a flowchart illustrating a method 2100 for resource patterns for uplink transmissions in accordance with aspects of the present disclosure. The operations of method 2100 may be implemented by a base station 105 or its components as described herein. For example, the operations of method 2100 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 2105 the base station 105 may identify a set of UEs associated with a transmission opportunity period. The operations of 2105 may be performed according to the methods described herein. In certain examples, aspects of the operations of 2105 may be performed by an identification component as described with reference to FIGS. 11 through 14.

At 2110 the base station 105 may apportion the set of UEs into a set of groups, each group associated with a respective resource offset, where each respective resource offset comprises a timing offset. The operations of 2110 may be performed according to the methods described herein. In certain examples, aspects of the operations of 2110 may be performed by a segmentation component as described with reference to FIGS. 11 through 14.

At 2115 the base station 105 may determine a cyclic shift offset for each group. The operations of 2115 may be performed according to the methods described herein. In certain examples, aspects of the operations of 2115 may be performed by a schedule manager as described with reference to FIGS. 11 through 14.

At 2120 the base station 105 may determine a scheduling parameter for each UE 115 of the set of UEs based at least in part on a number of UEs 115 in the set of UEs and the cyclic shift offset for each group. The operations of 2120 may be performed according to the methods described herein. In certain examples, aspects of the operations of 2120 may be performed by a schedule manager as described with reference to FIGS. 11 through 14.

At 2125 the base station 105 may transmit the scheduling parameter to each UE 115 of the set of UEs. The operations of 2125 may be performed according to the methods described herein. In certain examples, aspects of the operations of 2125 may be performed by a downlink transmission controller as described with reference to FIGS. 11 through 14.

Figure 22:
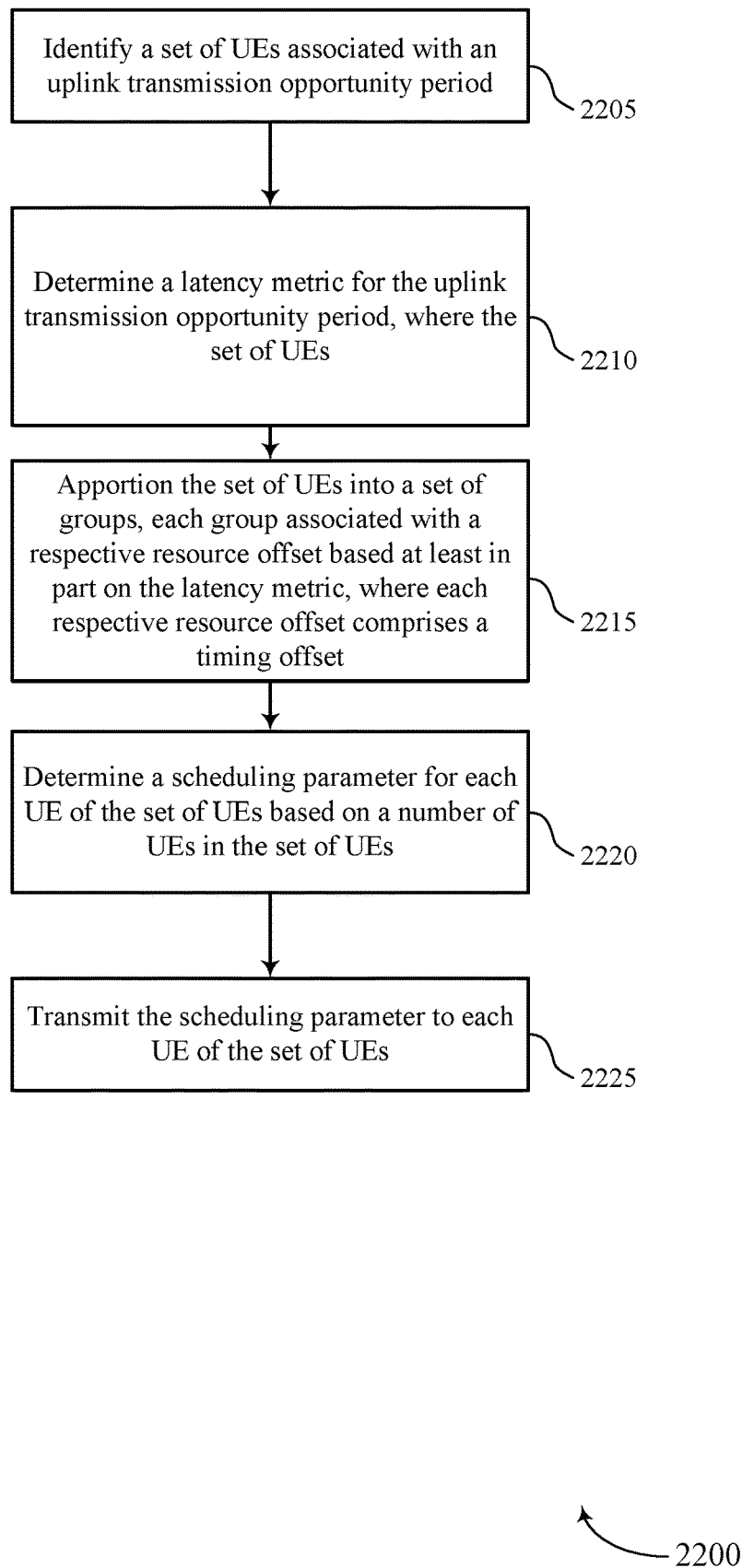

FIG. 22 shows a flowchart illustrating a method 2200 for resource patterns for uplink transmissions in accordance with aspects of the present disclosure. The operations of method 2200 may be implemented by a base station 105 or its components as described herein. For example, the operations of method 2200 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 2205 the base station 105 may identify a set of UEs associated with a transmission opportunity period. The operations of 2205 may be performed according to the methods described herein. In certain examples, aspects of the operations of 2205 may be performed by an identification component as described with reference to FIGS. 11 through 14.

At 2210 the base station 105 may determine a latency metric for the transmission opportunity period. The operations of 2210 may be performed according to the methods described herein. In certain examples, aspects of the operations of 2210 may be performed by a segmentation component as described with reference to FIGS. 11 through 14.

At 2215 the base station 105 may apportion the set of UEs into a set of groups, each group associated with a respective resource offset based at least in part on the latency metric, where each respective resource offset comprises a timing offset. The operations of 2215 may be performed according to the methods described herein. In certain examples, aspects of the operations of 2215 may be performed by a segmentation component as described with reference to FIGS. 11 through 14.

At 2220 the base station 105 may determine a scheduling parameter for each UE 115 of the set of UEs based at least in part on a number of UEs 115 in the set of UEs. The operations of 2220 may be performed according to the methods described herein. In certain examples, aspects of the operations of 2220 may be performed by a schedule manager as described with reference to FIGS. 11 through 14.

At 2225 the base station 105 may transmit the scheduling parameter to each UE 115 of the set of UEs. The operations of 2225 may be performed according to the methods described herein. In certain examples, aspects of the operations of 2225 may be performed by a downlink transmission controller as described with reference to FIGS. 11 through 14.

Figure 23:
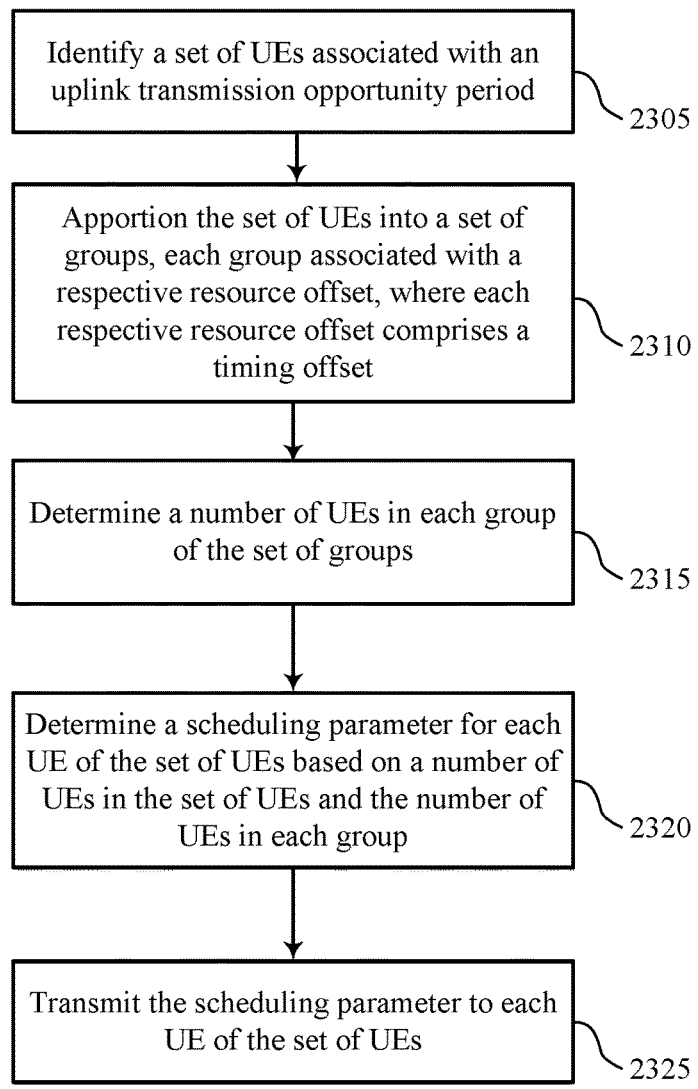

FIG. 23 shows a flowchart illustrating a method 2300 for resource patterns for uplink transmissions in accordance with aspects of the present disclosure. The operations of method 2300 may be implemented by a base station 105 or its components as described herein. For example, the operations of method 2300 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 2305 the base station 105 may identify a set of UEs associated with a transmission opportunity period. The operations of 2305 may be performed according to the methods described herein. In certain examples, aspects of the operations of 2305 may be performed by an identification component as described with reference to FIGS. 11 through 14.

At 2310 the base station 105 may apportion the set of UEs into a set of groups, each group associated with a respective resource offset. The operations of 2310 may be performed according to the methods described herein. In certain examples, aspects of the operations of 2310 may be performed by a segmentation component as described with reference to FIGS. 11 through 14.

At 2315 the base station 105 may determine a number of UEs 115 in each group of the set of groups. The operations of 2315 may be performed according to the methods described herein. In certain examples, aspects of the operations of 2315 may be performed by a schedule manager as described with reference to FIGS. 11 through 14.

At 2320 the base station 105 may determine a scheduling parameter for each UE 115 of the set of UEs based at least in part on a number of UEs 115 in the set of UEs and the number of UEs 115 in each group. The operations of 2320 may be performed according to the methods described herein. In certain examples, aspects of the operations of 2320 may be performed by a schedule manager as described with reference to FIGS. 11 through 14.

At 2325 the base station 105 may transmit the scheduling parameter to each UE 115 of the set of UEs. The operations of 2325 may be performed according to the methods described herein. In certain examples, aspects of the operations of 2325 may be performed by a downlink transmission controller as described with reference to FIGS. 11 through 14.

Figure 24:
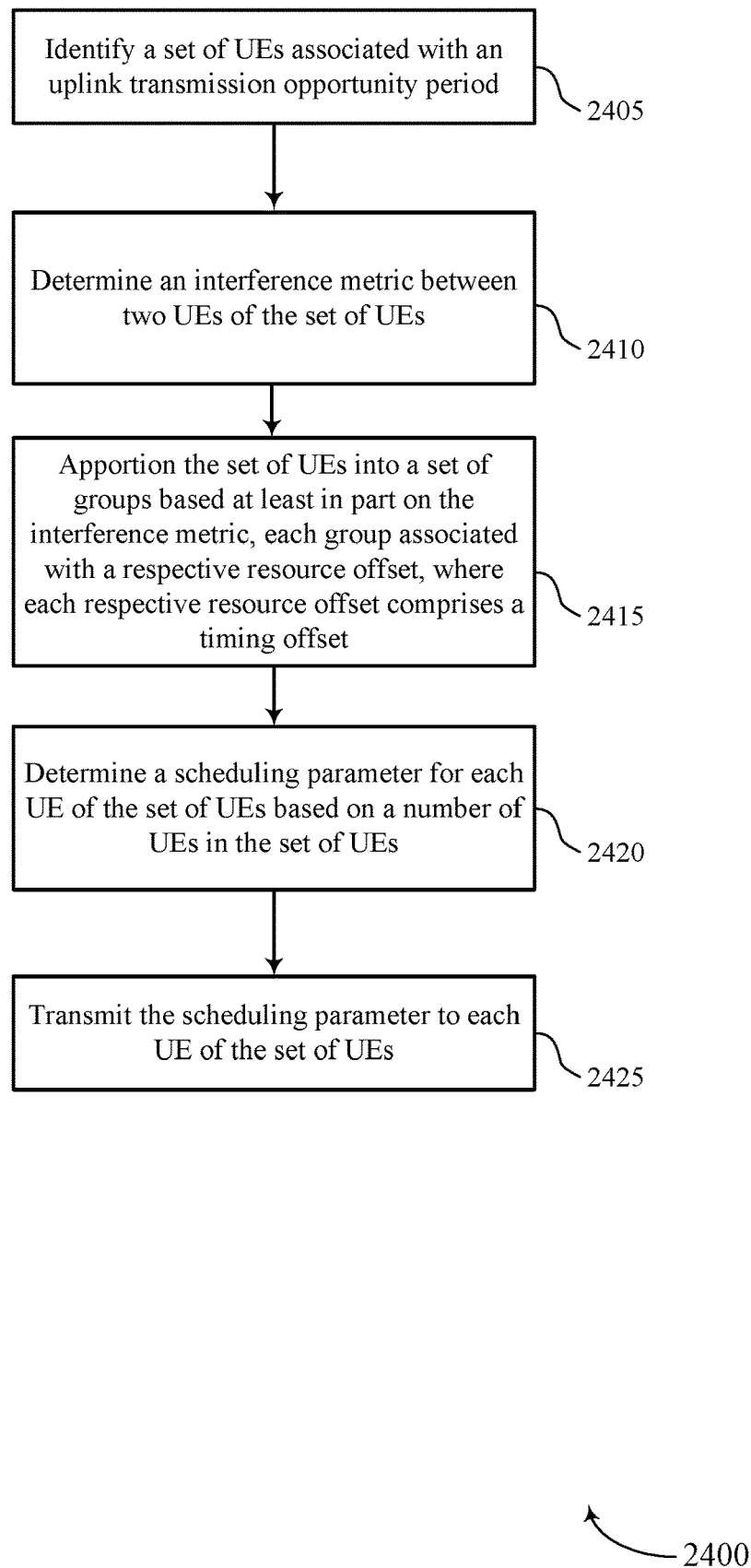

FIG. 24 shows a flowchart illustrating a method 2400 for resource patterns for uplink transmissions in accordance with aspects of the present disclosure. The operations of method 2400 may be implemented by a base station 105 or its components as described herein. For example, the operations of method 2400 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 2405 the base station 105 may identify a set of UEs associated with a transmission opportunity period. The operations of 2405 may be performed according to the methods described herein. In certain examples, aspects of the operations of 2405 may be performed by an identification component as described with reference to FIGS. 11 through 14.

At 2410 the base station 105 may determine an interference metric between two UEs 115 of the set of UEs. The operations of 2410 may be performed according to the methods described herein. In certain examples, aspects of the operations of 2410 may be performed by a segmentation component as described with reference to FIGS. 11 through 14.

At 2415 the base station 105 may apportion the set of UEs into a set of groups, each group associated with a respective resource offset based at least in part on the interference metric. The operations of 2415 may be performed according to the methods described herein. In certain examples, aspects of the operations of 2415 may be performed by a segmentation component as described with reference to FIGS. 11 through 14.

At 2420 the base station 105 may determine a scheduling parameter for each UE 115 of the set of UEs based at least in part on a number of UEs 115 in the set of UEs. The operations of 2420 may be performed according to the methods described herein. In certain examples, aspects of the operations of 2420 may be performed by a schedule manager as described with reference to FIGS. 11 through 14.

At 2425 the base station 105 may transmit the scheduling parameter to each UE 115 of the set of UEs. The operations of 2425 may be performed according to the methods described herein. In certain examples, aspects of the operations of 2425 may be performed by a downlink transmission controller as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, a scheduling parameter associated with a transmission opportunity period;
   determining, based at least in part on the scheduling parameter, a plurality of resource offsets for the UE, wherein each resource offset of the plurality of resource offsets comprises a timing offset; and
   performing an uplink transmission using a set of transmission resources associated with the plurality of resource offsets.

2. The method of claim 1, further comprising:
   determining a periodicity of the transmission opportunity period based at least in part on the scheduling parameter; and
   determining the set of transmission resources based at least in part on the periodicity of the transmission opportunity period and the plurality of resource offsets for the UE with respect to the transmission opportunity period.

3. The method of claim 1, further comprising:
   determining a cyclic shift offset associated with the UE;
   determining a number of UEs associated with the transmission opportunity period based at least in part on the scheduling parameter; and
   wherein determining the plurality of resource offsets for the UE is based at least in part on the number of UEs associated with the transmission opportunity period and the determined cyclic shift offset.

4. The method of claim 1, further comprising:
   determining a base sequence and a cyclic shift offset associated with the UE;
   wherein determining the plurality of resource offsets for the UE is based at least in part on the base sequence and the determined cyclic shift offset.

5. The method of claim 1, further comprising:
   identifying an interference metric for at least one other UE associated with the transmission opportunity period, wherein the plurality of resource offsets is determined based at least in part on the interference metric.

6. The method of claim 1, wherein the scheduling parameter comprises a first explicit indication of a number of UEs associated with the transmission opportunity period, a number of cyclic shifts, a periodicity of the transmission opportunity period, or a combination thereof; a second explicit indication of a number of the plurality of resource offsets; or both.

7. The method of claim 1, wherein the scheduling parameter comprises an index of a look-up table, the index indicating a number of UEs associated with the transmission opportunity period, a number of the plurality of resource offsets, or both.

8. The method of claim 1, wherein the uplink transmission comprises a sounding reference signal (SRS) transmission, a scheduling request transmission, or a data transmission.

9. The method of claim 8, wherein the data transmission comprises a grant-free uplink transmission.

10. The method of claim 1, wherein determining the plurality of resource offsets for the UE comprises:
    determining a plurality of resource block indices of the transmission opportunity period.

11. The method of claim 1, wherein each resource offset of the plurality of resource offsets further comprises a frequency offset.

12. A method for wireless communication at a base station, comprising:
    identifying a plurality of user equipment (UEs) associated with a transmission opportunity period;
    apportioning the set of UEs into a set of groups, each group associated with a respective resource offset, wherein each respective resource offset comprises a timing offset, and wherein at least two groups of the set of groups comprise a same UE of the set of UEs;
    determining a scheduling parameter for each UE of the set of UEs based at least in part on a number of UEs in the set of UEs; and
    transmitting the scheduling parameter to each UE of the set of UEs.

13. The method of claim 12, further comprising:
    determining a periodicity of the transmission opportunity period based at least in part on the number of UEs in the set of UEs.

14. The method of claim 13, further comprising:
    determining the resource offset for each group based at least in part on the number of UEs in the set of UEs;

identifying a set of transmission resources for each group based at least in part on the periodicity of the transmission opportunity period and the resource offset for the group; and receiving an uplink transmission over at least one set of transmission resources.

15. The method of claim 14, wherein the uplink transmission comprises a sounding reference signal (SRS) transmission, a scheduling request (SR) transmission, or a data transmission.

16. The method of claim 15, wherein the data transmission comprises a grant-free uplink transmission.

17. The method of claim 12, further comprising:
determining a base sequence of resource offsets;
determining a cyclic shift offset for each UE of the set of UEs, wherein the scheduling parameter is based at least in part on the determined base sequence of resources offsets and the determined cyclic shift offset.

18. The method of claim 12, further comprising:
determining a latency metric for the transmission opportunity period, wherein the set of UEs are apportioned into the set of groups based at least in part on the latency metric.

19. The method of claim 12, further comprising:
determining a number of UEs in each group of the set of groups, wherein the scheduling parameter is based at least in part on the number of UEs in the set of UEs and the number of UEs in each group.

20. The method of claim 12, further comprising:
determining an interference metric between two UEs of the set of UEs, wherein the set of UEs are apportioned into the set of groups based at least in part on the interference metric.

21. The method of claim 12, wherein a scheduling parameter for a UE of the set of UEs comprises a first explicit indication of the number of UEs associated with the transmission opportunity period, a number of cyclic shifts, a periodicity of the transmission opportunity period, a combination thereof; a second explicit indication of a number of resource offsets for the UE; or both.

22. The method of claim 12, wherein a scheduling parameter for a UE of the set of UEs comprises an index of a look-up table, the index indicating the number of UEs associated with the transmission opportunity period, a number of resource offsets for the UE, or both.

23. The method of claim 12, wherein each resource offset comprises an index to a resource block of the transmission opportunity period.

24. The method of claim 12, wherein each group of the set of groups comprises a unique set of UEs of the set of UEs.

25. The method of claim 12, wherein each group of the set of groups comprises a respective pair of UEs of the set of UEs.

26. The method of claim 25, wherein the set of groups comprises each possible pair of UEs of the set of UEs.

27. The method of claim 12, wherein each respective resource offset further comprises a frequency offset.

28. An apparatus for wireless communication, comprising:
a processor;
memory in electronic communication with the processor; and
instructions stored in the memory and executable by the processor to cause the apparatus to:
receive, from a base station, a scheduling parameter associated with a transmission opportunity period;
determine, based at least in part on the scheduling parameter, a plurality of resource offsets for the apparatus, wherein each resource offset of the plurality of resource offsets comprises a timing offset; and
perform an uplink transmission using a set of transmission resources associated with the plurality of resource offsets.

29. The apparatus of claim 28, wherein the instructions are further executable by the processor to cause the apparatus to:
determine a cyclic shift offset associated with the apparatus;
determine a number of user equipment (UEs) associated with the transmission opportunity period based at least in part on the scheduling parameter; and
determine the plurality of resource offsets for the apparatus based at least in part on the number of user equipment (UEs) associated with the transmission opportunity period and the determined cyclic shift offset.

30. An apparatus for wireless communication, comprising:
a processor;
memory in electronic communication with the processor; and
instructions stored in the memory and executable by the processor to cause the apparatus to:
identify a plurality of user equipment (UEs) associated with a transmission opportunity period;
apportion the set of UEs into a set of groups, each group associated with a respective resource offset, wherein each respective resource offset comprises a timing offset, and wherein at least two groups of the set of groups comprise a same UE of the set of UEs;
determine a scheduling parameter for each UE of the set of UEs based at least in part on a number of UEs in the set of UEs; and
transmit the scheduling parameter to each UE of the set of UEs.

* * * * *